Jan. 11, 1955        P. T. NIMS        2,699,218
CONTROL APPARATUS
Filed June 24, 1949                    7 Sheets-Sheet 7
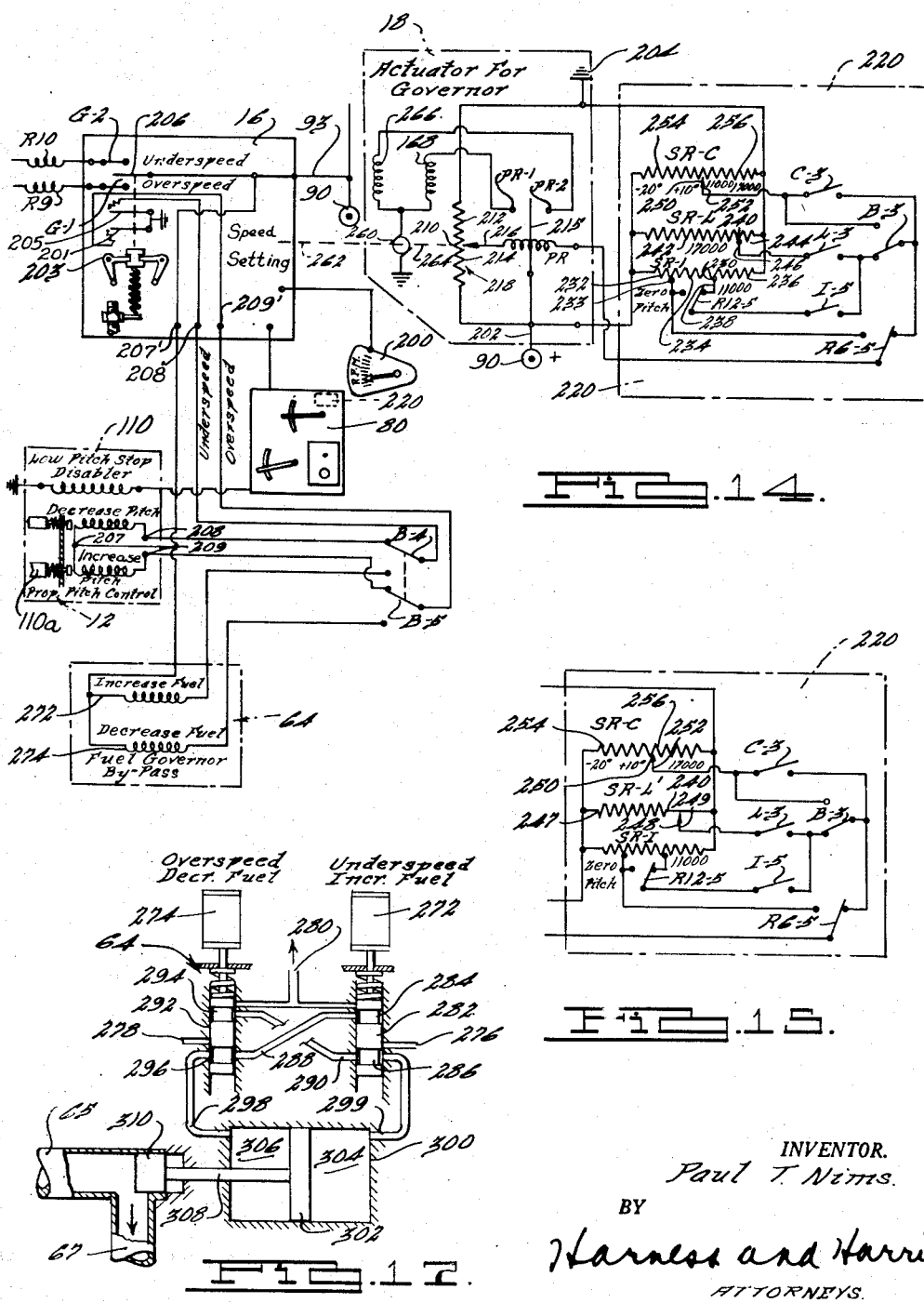
INVENTOR.
Paul T. Nims.
BY
Harness and Harris
ATTORNEYS.

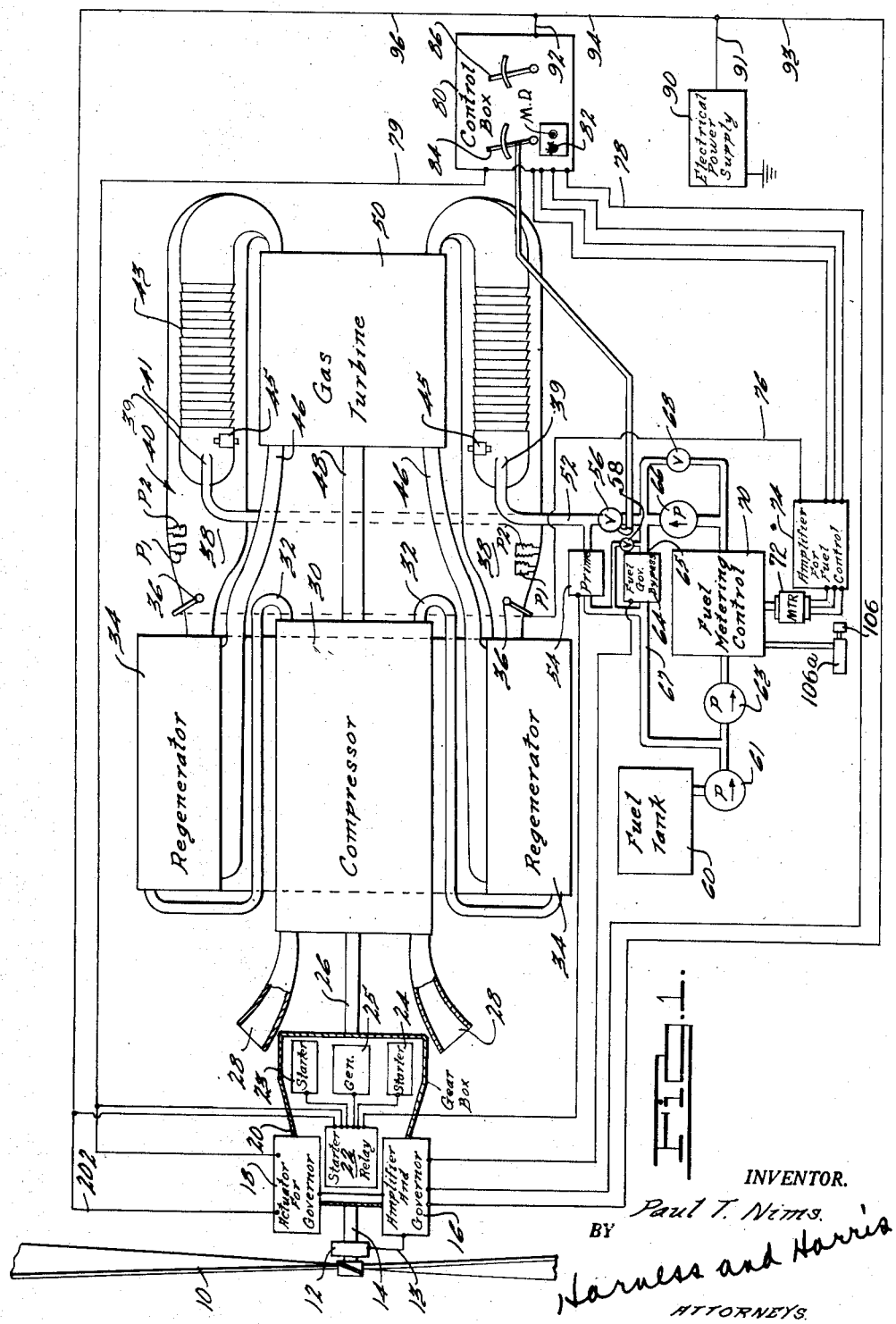

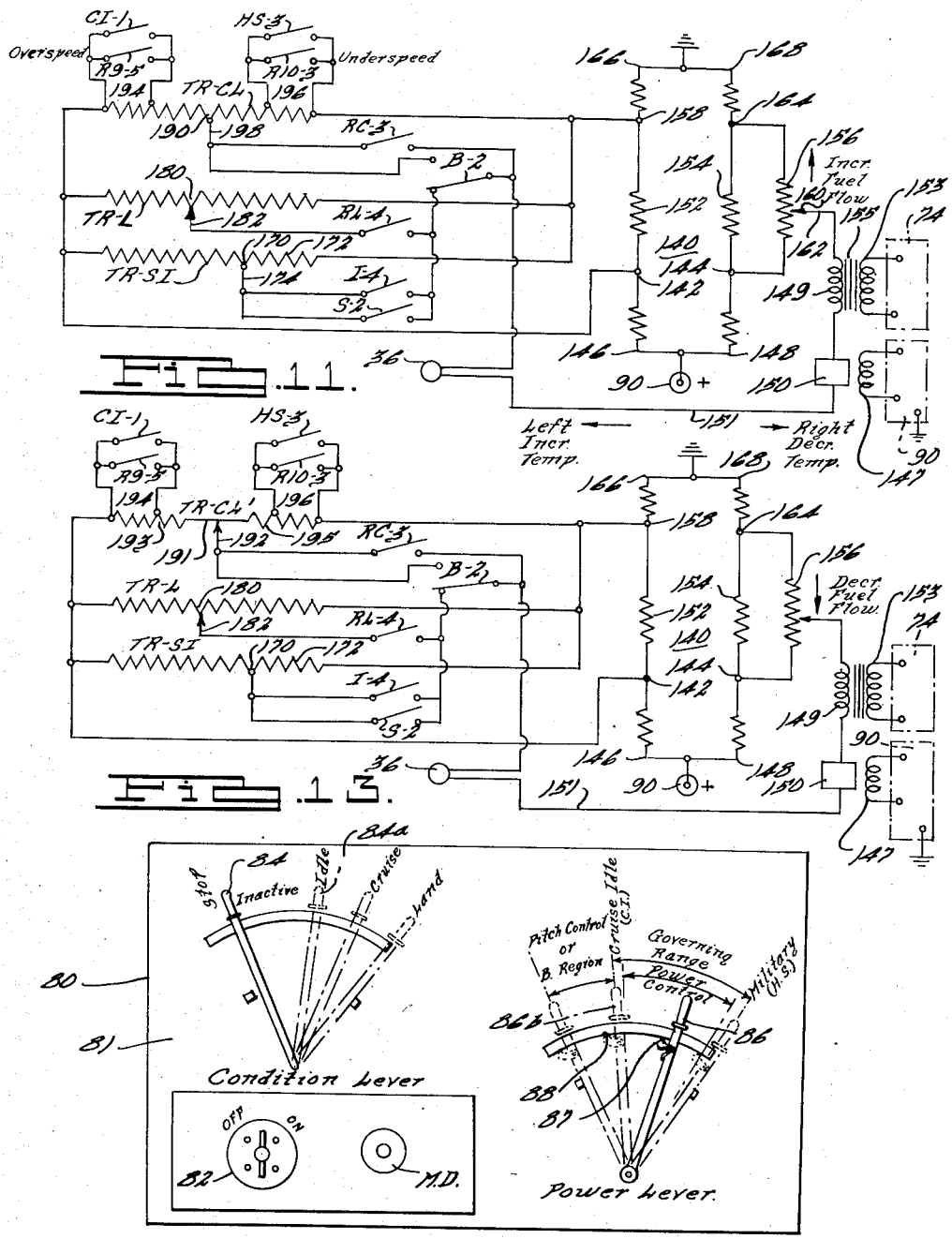

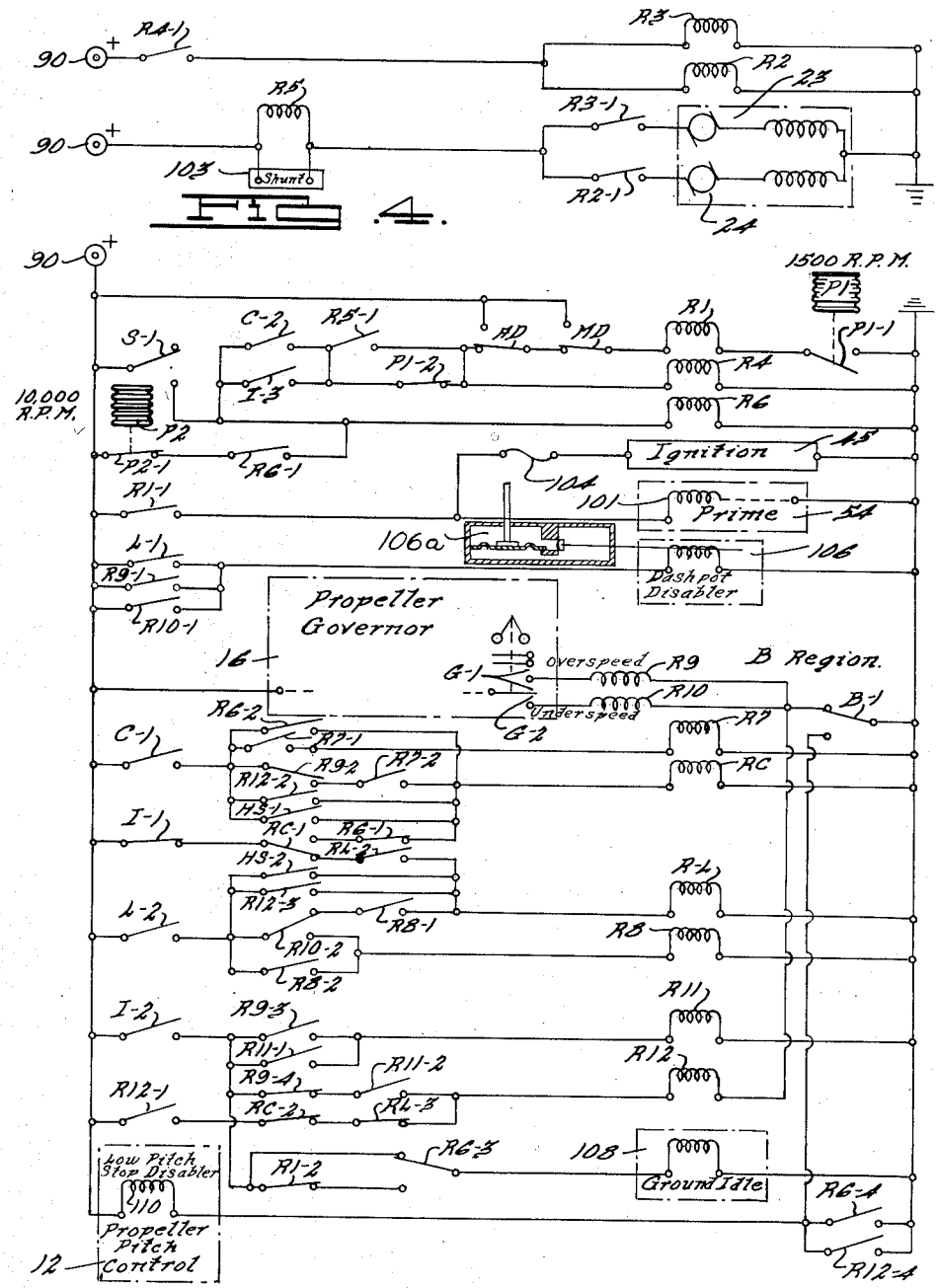

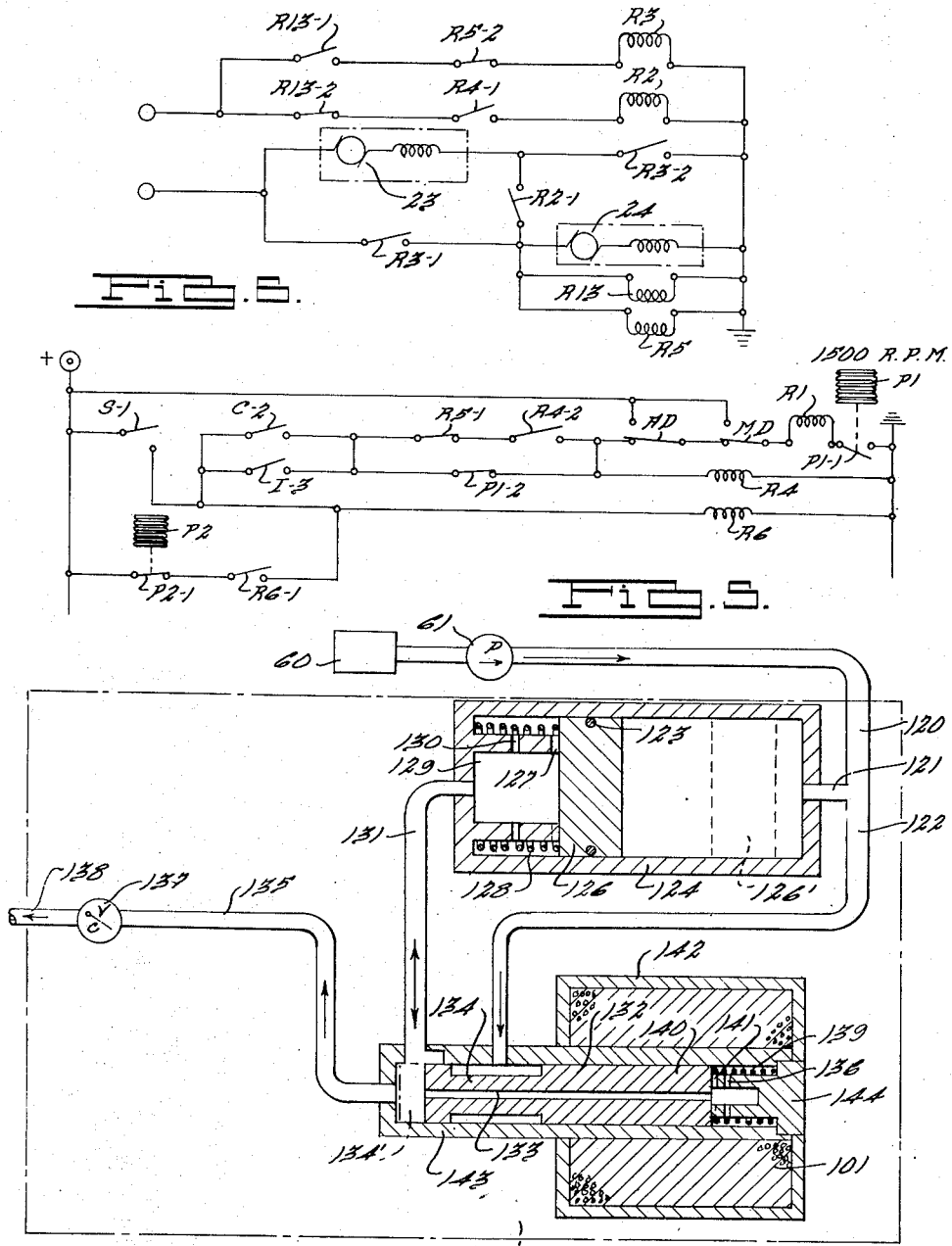

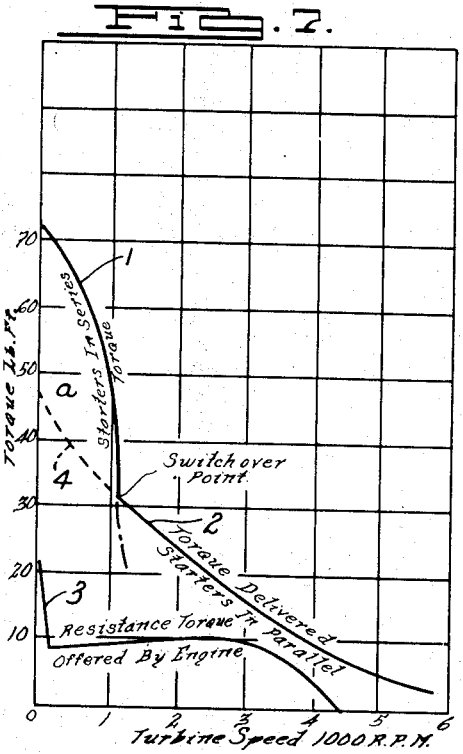
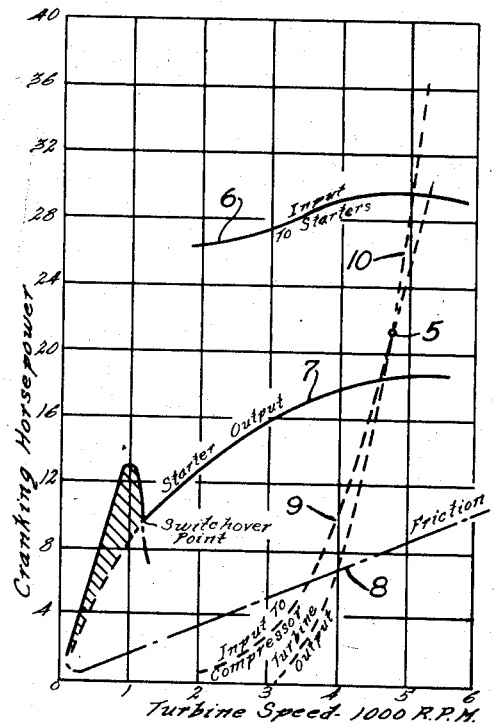
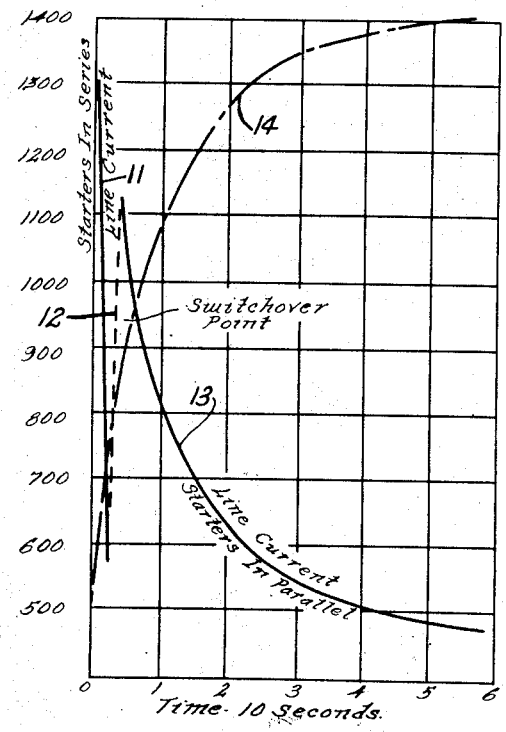

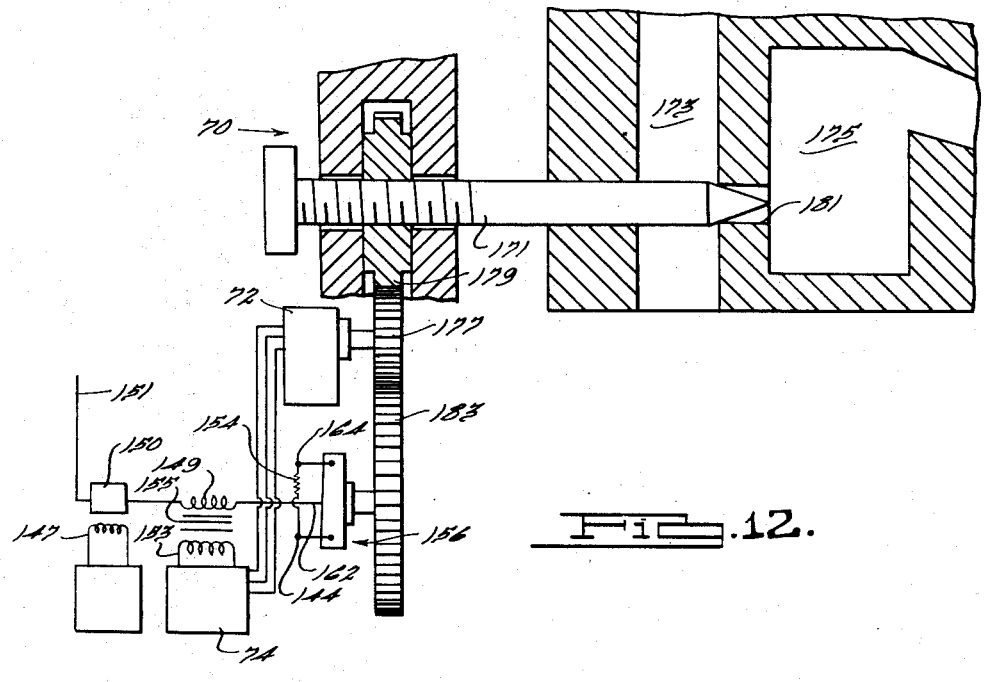

United States Patent Office 2,699,218
Patented Jan. 11, 1955

2,699,218

CONTROL APPARATUS

Paul T. Nims, Detroit, Mich., assignor to Chrysler Corporation, Highland Park, Mich., a corporation of Delaware Application June 24, 1949, Serial No. 101,119

10 Claims. (Cl. 170—135.7)

This application relates to a control for a power plant, and particularly to a control for turbine driven aircraft.

It is an object of the present invention to provide a system maintaining predetermined temperatures for hot gases driving a turbine.

A further object is to provide complete control over aircraft propelling elements by a system employing a minimum of manual controls and demanding a minimum of attention from the operator.

Another object is to provide means whereby good ground handling control is afforded to the operator of aircraft.

Still another object is the provision of control apparatus for a power plant displaying a minimum of delay in response.

Yet another object is to provide controls which automatically time and coordinate the elements involved in a starting cycle.

Still a further object is to provide controlling apparatus which permits a relatively rapid speed reduction without unduly overloading the machinery and shafting being decelerated.

A yet further object is to provide for different systems of operating control in control apparatus wherein the transitions are effected expeditiously and automatically through suitable electrical devices.

Other objects will appear from the disclosure.

In the drawings:

Fig. 1 is a partly schematic view of a power plant including a gas turbine to which controls of the present invention are shown applied;

Fig. 2 is a front view of the unified power control box;

Fig. 3 is a wiring diagram showing the fundamental circuits of a preferred embodiment of the power control;

Fig. 4 is a wiring diagram of the engine starter circuits;

Figs. 5 and 6, corresponding respectively to Figs. 3 and 4 of the first embodiment, show a modified form thereof;

Figs. 7, 8, and 9 are graphs illustrating the operation of the apparatus of Figures 5 and 6;

Fig. 10 is a section view of the prime solenoid unit;

Fig. 11 is a wiring diagram of the temperature resistor circuits;

Fig. 12 shows the associated fuel metering needle and gearing used in conjunction with the temperature resistors of Figure 11;

Fig. 13 shows a non-linear resistor applied to the temperature resistors of Figure 11;

Fig. 14 is a wiring diagram of the speed resistors and connected governor circuits;

Fig. 15 shows a non-linear resistor applied to the speed resistors of Fig. 14;

Fig. 16 is a graph showing the operating behavior of the apparatus involved under influence of the governor of Fig. 14; and Fig. 17 is a view of the fuel governor bypass in section.

In reference to the drawings, Figure 1 shows a power plant for driving an aircraft propeller 10. The power plant may comprise a compressor 30, a regenerator 34 surrounding the compressor, a plurality of burners 40, and a gas turbine 50. Turbine 50 may be driven by hot gases produced by combustion of fuel and air in the burners 40, and may drive the compressor 30 through appropriate connecting means represented by the character of reference 48. The compressor 30, which may be of the axial type, may draw in air at its left end through scoops 28. Compressed air may be delivered from the right end of the compressor 30 into conduit means 32 which conduct the compressed air to the regenerator 34. The compressed air follows a zig-zag path through the regenerator 34 and is thereby heated by exhaust gases passing from the gas turbine 50 through conduit means 46 to the regenerator 34. Heated compressed air passes from the regenerator 34 through conduit means 38 which enclose the burners 40. Each burner is formed of a fuel nozzle 39 and an air tube 41 formed in its intermediate portion of nested frustum-like sections 43, which permit air to pass through the tube wall to the nozzles 39. Adjacent the mouth of the nozzles in the walls of the tubes 41 is an ignition means 45, used to originate a flame which may be normally self-sustaining once started. Adjacent the discharge ends of the tubes may be located pressure capsules P1 and P2, set to actuate certain control switches at predetermined pressures such as will exist in the system during its operating cycle. The tubes 41 are curved at their discharge ends to direct the streams of hot gases formed in the burners 40 toward the inlet end of gas turbine 50, which may be positioned within the burners 40. For a more complete showing of the arrangement of compressor, regenerator, burners, and gas turbine, reference may be had to the copending application of Staley and Williams, Serial No. 715,840, dated December 12, 1946, now Patent No. 2,631,430. For a more complete showing of the burner tubes 41 with the frustum-like sections 43, reference should be made to the copending application of Samuel B. Williams, Serial No. 715,873, filed December 12, 1946, now Patent No. 2,603,064.

The compressor 30, which has been previously described as being driven from the gas turbine 50 through means 48, is drivingly connected by means 26 with a propeller reduction drive 20, which in turn drives the shaft 14 on which the propeller 10 is mounted. Thus propeller 10 is driven from the gas turbine 50 at a reduced speed. A propeller speed governor 16, which includes parts responsive to the speed of propeller 10, is schematically represented along with its actuator 18 as regulating the hydraulic pitch control means 12 for propeller 10 through a connection 13.

Fuel may be supplied to the nozzles 39 through the agency of fuel control 70, regulating the fuel flow from supply tank 60. Tank 60 furnishes fuel also to prime cylinder unit 54, which along with control 70, feeds into nozzle distribution line 52. A stop valve ahead of the junction of the prime cylinder is indicated at 56. A fuel governor 64 actuated by the electronic propeller governor 16, serves to control a bypass around control 70, and is in turn bypassed by a valve 58. On the discharge side of the control 70 is a main fuel pump 66 bypassed by a controlled valve 68; on the inlet side of 70 are a boost pump 61 and a transfer pump 63. The control 70 contains a delicate metering valve susceptible to the fine adjustments afforded by a rapidly responsive fuel metering motor 72. Regulating the operation of motor 72 is the fuel control amplifier 74 which responds to signals transmitted by conductor 76 from temperature responsive devices 36 which may be thrust into the compressed air stream ahead of the burners 40.

For actuation of the amplifier 74, attention must be called to control box 80 powered by electrical supply source 90. Box 80, by means of conductor cables 79 and 78, exercises control over the units clustered around the reduction gear box. Included among these nose units and serving to complete the picture, are a starter relay assembly 22, starters 23 and 24, and a generator unit 25.

In regard to Fig. 2, the box 80 may be seen to have but few manual controls on its panel face 81. A master switch 82 may be provided and also a manual ignition switch MD affording as a double check an auxiliary method of operating the ignition circuit, namely by manual effort of the pilot. At one end of the panel of the embodiment shown appears a "condition" lever 84. This lever serves to close and open switches which set the "condition" of the control circuits by a system of relays and opening and closing connections. The sphere of direct influence of this lever is limited to switches, these switches setting the "condition" of the control circuits—i. e., by energizing, preparing, disabling, etc.—through the medium of a plurality of relays and contacts. Covered in the arc of travel of lever 84 are four positions: namely, "stop," "idle," "cruise," and "land."

At the other end of the control panel may be located a power lever 86. Instead of controlling by switches as was noted for condition lever 84, lever 86 is generally effective in directly regulating the positioning of rheostat circuits selectively prepared by condition lever 84. Power lever 86 preferably carries a device 87 answering to the purpose of a detent which registers into indexing means provided at 88, the means serving to divide the angle of swing of lever 88 into two portions. The right hand portion may be described the "governing" range, from which to move the power lever into the left hand or "B region" portion. The operator must make a positive effort to overcome the resistance offered by registering device 87. System control is effected in an altogether different fashion in the "governing" range portion from that in the "B region." Generally in the former, power control signals are directed to the propeller governor regulating the propeller governor setting and allowing the nozzle box temperatures to change. Travel of the power lever over into the latter portion actuates a plurality of "B region" switches which for the most part transfer the power control rheostats onto circuits directly regulating the propeller pitch setting.

The "governing" range of the power lever 86 has a broad sweep marked "power control" which is bounded at extreme portions by "cruise idle" and "military." Besides moving the positions of slide wires while it is in the "cruise" range, the power lever operates to keep closed one switch (CI–1) in "cruise idle" and three different switches (HS–1, HS–2, HS–3) in "military."

A more detailed treatment of the effects of these control levers will appear in the discussion to follow of the wiring diagrams.

In the embodiment of Figs. 3 and 4, there is shown a general layout concerned more or less with connections actuated by the "condition" lever. Power may be supplied to the system at the left hand side from source 90, with the ground bus being located on the right hand side. Those switches normally open are shown as such and those normally closed are shown closed. Normally open switch S–1 in the upper left hand corner of Fig. 3 is arranged to be closed only when the "condition" lever is in the "stop" (S) position. Switches I–1, I–2, and I–3, normally opened or closed as shown, operate only when the "condition" lever is in the "idle" (I) position. Similarly, the notation C–1 and C–2 applies to switches operative when the "condition" lever is in the "cruise" (C) position while L–1, L–2, L–3, and L–4 apply to switches affected when the "land" (L) position is effected.

Switches marked AD and MD, located in the upper reaches of Figure 3, are for the purpose of affording a double-check on the ignition control. While there is provided an automatic means of ignition, AD and MD may accomplish the same function. Switch AD may be automatically operated as by a pressure change in the fuel supply line to the burners such as would be occasioned by violent maneuvers or the pilot's failure to switch to another fuel tank upon exhaustion of the fuel supply of the tank in use; conveniently then a pressure switch, the transfer contacts of switch AD on being actuated would serve to maintain ignition support in the burners at all times the nozzles were being starved and tending to allow the nozzle box flames to become extinguished. The operation of manual switch MD has been hereinabove discussed in connection with Fig. 2.

In the upper portions of Fig. 3 are shown pressure capsules P2 and P1, a timing means located at the compressor outlet which operates switches P2–1, and P1–1 and P1–2 respectively. Also appearing are governor switches G–1 and G–2. There may be additionally provided in the governor circuit a transfer switch B–1 arranged to be actuated when the "power" lever is in the "B region." To be noted in regard to switches C–1 and I–1 respectively are switches HS–1 and HS–2 operated as has been mentioned above by the power lever when it assumed the "military" position.

The balance of the contacts are ganged in stacks operated by a plurality of relay coils, R numbers 1 to 12, RC and RL. The contact is related to the individual relay such as relay R1, by the identifying notation R1–1, R1–2, etc.

Being of a small size for the most part, these contacts are nonetheless sized for the particular apparatus they serve. By way of example, in Fig. 4 the uppermost contact R4–1 may be a leaf-type, while the lowermost switches R3–1 and R2–1, operated by the heavy duty main starter relays R3 and R2, may be provided with king-size contacts.

In regard to the particular apparatus served by these switches, in Fig. 4 may be seen a shunt 103 serving the series-wound paralleled main starters 23 and 24. Across the shunt 103 may be connected a series relay R5, actuated only at such times as when heavy currents are being carried by the shunt. In the upper reaches of Fig. 3, and served by switch R1–1, may be seen a flame initiating circuit for the burners comprising an ignition device 45 and burner prime device 54 in parallel. Device 45 may serve to provide a spark, a slug of spontaneously igniting liquid, or other flame prompting means to the burners. Prime device 54 may serve to prime and prepare the fuel lines for operation to be continued by the fuel metering control.

To be used in conjunction with the amplifier for the fuel metering control, may be seen a dashpot disabler 106 which bypasses a dashpot 106$^a$ mounted to the fuel metering control 70 and a ground idle solenoid 108. The disabler 106 may operate to disable a dashpot 106$^a$ used to stabilize the rate of change of fuel flow demanded by the amplifier. Under certain operating conditions it may be desirable that the rate of change of fuel flow be definitely limited, while under other conditions the dashpot effect may be unnecessary and disabler 106 serves to inactivate the dashpot stabilization. For a complete treatment of the operation of such a dashpot device as may be contemplated for employment in this application, reference is directed to copending application Serial No. 763,576, filed July 25, 1947, in the names of Vogt et al., now U. S. Patent No. 2,609,662. The above mentioned ground idle solenoid 108 is so connected to the metering control amplifier as when actuated, to disable the amplifier and lock the metering control in a pre-set condition of very limited constant flow.

Propeller governor 16, by means of the contacts 201 and 205, is arranged such that it may exert control over the pitch setting of the propeller and, by means of relays R9 and R10, the nozzle box temperature. The governor may be set with a predetermined limit at which its rate of change of pitch may be effected.

In the lowermost portion of Fig. 3, is shown propeller pitch control 12 containing a stop removing solenoid 110. A stop may be provided in the control 12 to limit the extent to which the propeller pitch may ultimately be decreased. Solenoid 110, connected to ground by switches B–1, R6 and R12 in parallel, is arranged when operated to remove the low limit setting of the propeller pitch.

As to operation of the system shown in Figs. 1 through 4, the starting cycle may be appropriate as the first phase to consider. To make a normal start with the aircraft on the ground, the master switch 82 is turned on to place the supply bus on the line with the power supply. The power lever is deliberately rendered sterile when the condition lever is in its "stop" and "idle" positions. Consequently the starting cycle is an operation independent of the power lever and the particular setting assumed by it may be deemed inconsequential and ignored for starting purposes. The power lever 86 may be moved rearwardly to engage the indexing means 88, thereby assuming the "cruise idle" position 86$^b$. Condition lever 84 is swung to the "stop" position. This position of the condition lever will open certain mechanically operated valves not shown, to drain the combustion chambers and generally to prepare the fuel system for the starting cycle. Moreover, during the "stop" or "S" condition, the switch S–1 of Fig. 3 will make a connection from the power terminal 90 to relay R6 which latter may therefore close and operate the various contacts in its stack. One such set of contacts R6–1, in series with the pressure capsule switch P2–1, closes a self-holding circuit for the relay R6 such as will be maintained then independently of the position of the condition lever until such time as switch P2-1 opens. Two more sets of contacts R6-2 and R6-3, merely indirectly prepare circuits for switches C-1 and I-2 respectively. Yet contacts R6-4 act directly to actuate, for removing the mechanical low pitch stop from the propeller, the solenoid 110 in pitch control 12 to the end that the propeller may be swung into flat pitch.

The condition lever may now be advanced to "idle" position 84ª, Figure 2, thereby effecting a release of the "stop" or "S" series of switches and actuating the "idle" switches I-1, I-2, and I-3. As to the actuation of I-1 and I-2, no direct results follow since these switches merely affect circuits remaining inactive until a more advanced stage of operation is attained However, switch I-3 closes a circuit from the power supply 90 through certain preparing switches comprising normally closed switch P2-1 and switch R6-1, leading to normally closed switch P1-2 which circuit proceeds to cause energization of relay R4. Relay R4 therefore closes and its single contact R4-1 connects the power source 90 directly to relays R3 and R2. Heavy duty contacts R3-1 and R2-1 close to throw the paralleled starters 23 and 24 onto the line. These starters, breaking the rotating machinery away from standstill condition, draw heavily on current with the result that series relay R5, operates across shunt 103 to close the switch R5-1 paralleled with normally closed holding control P1-2 to put relay R4 in the circuit. Accordingly, from this stage on, relay R4 will not be in exclusive dependence on the pressure switch P1-2.

As stated, timing capsule P1 is located at the compressor outlet and may assume the form of a small bellows or sylphon. This capsule has a relatively low setting of an order which may correspond to say 1,500 R. P. M. of the engine at standard atmospheric pressure. At a higher altitude of course, the proper pressure does not build up until the engine speed is higher. Considered in the light that operation of pressure capsule P1 indirectly causes the burners to be primed and ignited, the mechanics of which operation are about to be disclosed, this automatic device is seen to be self-compensating, and of advantage as over a straight-timed starting cycle. Thus at sea level where sufficient air to have driven off accumulated explosive-like fumes and to support ignition and combustion is delivered at relatively lower compressor speeds, the capsule P1 operates early to start ignition and helps quickly to relieve the acceleration burden which to this point has to be borne by the starters unassisted. On the other hand, if the engine has to be started in a more rarified atmosphere where sufficient ignition air is delivered only at relatively higher compressor speeds or in a cold climate where stiff lubricating oils cause the engine to be sluggish and crank up to speed very slowly, the capsule P1 may operate late and prevent too previous an ignition which in absence of a substantial draft of air through the system, might cause an explosion in a comparatively closed system.

Acting under the effect of the continued efforts of the starters, the engine turns over, accelerating, and the compressor begins to acquire momentum. As the pressure switch P1 accordingly operates, it may throw a double pole double throw switch P1-1 and P1-2 closing the former and opening the latter. The opening of the latter, it bears to be noted, can have no effect to disable any circuit closed by the former at this particular state inasmuch as the switch R5-1, in parallel with the latter, is already closed thereby insuring a power supply to the circuit of switch P1-1. The switch P1-1 thereby causes relay R1 to be energized, opening switch R1-2 which prevents the ground idle solenoid 108 from acting, and closing switch R1-1 which initiates priming and ignition. Relay R1 can also be energized independently from two other sources at any time after P1 operates, switch MD and AD. The manual double-check switch MD is for the operator's peace of mind and serves to insure a flame condition in the burners. The automatic double-check switch AD has been discussed in detail in regard to the structure represented by Figures 3 and 4.

Closing of switch R1-1 causes ignition device 45, through a suitable circuit breaker 104, to be actuated and also prime device 54 to be actuated. It will be recalled that during the instant status of the system, the ground idle actuating solenoid 108 has been disabled by switch R6-3 such that the engine may receive a proper supply of fuel in place of the amount the ground idle device 108 would afford. Further, switch R6-4 has been closed to remove, by actuating low pitch removing solenoid 110 in control 12, the low pitch limit on the propeller such that the propeller may now assume a flat pitch condition. The turbine, unhampered as it were by a sizeable propeller load, begins to supply torque and gives an added boost to the accelerating rotor. Momentum is gained until at a speed of the order of 8,000 engine R. P. M. for example, the torque contribution of the starters has dwindled to a relatively meager amount. The coarsely set relay R5 in the starter circuit, now drawing a low current, fails to continue to operate and so releases its lone contacts R5-1. Such action causes the prime relay R1 and the starter relay R4 to drop out. Moreover, since the pressure switch P1-2 is held open so long as a moderate pressure exists in the compressor system, the starters' relay R4 has no means of being again energized, R5-1 and P1-2 being now open, until the system slows way down in rotative speed. Hence, re-engagement of the starters after the rotating machinery gains speed is prevented.

As observed, the dropping out of circuit of relay R1 causes action of the ignition means 45 and prime means 54 to be discontinued. Additionally, the switch R1-2 is allowed to resume its normally closed position, connecting idle switch I-2 to switch R6-3, the latter being under actuation, and to ground idle metering means 108. A circuit is completed and the fuel metering is changed to the bare amount necessary for maintaining idling speed, the minimum being perhaps of the order of 86 pounds per hour for certain installations. Inasmuch as the propeller may be set in flat pitch the limit to which the engine can accelerate on the constant, but reduced fuel supply, is established by the rotating resistance offered by the propeller in flat pitch. The design calculations may be such that the ground idle fuel flow may strike a balance with the load offered by the propeller such that the speed eventually assumed is, for example, of the order of 9500 R. P. M.

The engine may thus be brought up through the starting cycle to an idling condition with the aircraft being on the ground. The engine will continue so to idle until the condition lever is moved.

In respects to Figs. 5 and 6, apparatus similar to the first embodiment as shown in Figs. 3 and 4 is represented. Contrastingly, however, the instant configuration makes provision for a series-parallel operation of the main starters 23 and 24 during the starting cycle. Advantages which stand to be gained will appear from an analysis of the situation which existed at the time of starting. If from such a limited power source as batteries constitute, the available voltage is impressed across the terminals of starters lying idle but connected in series, the initial surge of current will not be so excessive as to cause a substantial fall of potential at the terminals and a lack of power. A paralleling of the starters under the same circumstances would of course bring about the latter situation and occasion an appreciable power loss along with it. The result of ultimately paralleling the starters, however, will be that at higher speeds the starter motors will have the added torque advantage due to the fact that the entire potential is available to each starter.

In the arrangement of Figs. 5 and 6, a general scheme is presented whereby the starters for any type application may be connected in series at low speeds and then automatically switched to parallel operation for higher speeds. Such an automatic cycle will result in more rapid starting and a substantial saving in drain on the battery or other power supply during the starting cycle. Operation of the instant scheme, showing how the paralleling is provided automatically at higher speeds, is presented below.

The structure of Figs. 5 and 6 requires as over the structure previously described, the addition of relay R13 and its attendant switches R13-1 and R13-2. Moreover, for this present particular structure there must be provided new switches R3-2, R4-2, and R5-2, and also the switch R5-1 must be rendered preferably normally closed instead of being normally open and the coil is arranged for operation in parallel with the starter. The balance of the circuit of Fig. 5 below the pressure capsules P1 and P2 is identical with the showing in Fig. 3.

Operation, as regards Figs. 5 and 6, may be as follows. When starter relay R4 is energized due to closure of the switch I–3 by the condition lever being advanced to "idle" position, the switches R4–1 and R4–2 may be thereby closed. Relay R2 is accordingly energized to close switch R2–1 which causes the starters to begin operation in series. Under influence of the starters 23 and 24 the rotating machinery gains speed of say, for example, 1,500 R. P. M. such that the compressor discharge pressure attains the amount necessary to operate pressure capsule P1, closing contacts P1–1 and opening contacts P1–2. Contacts P1–1 may energize relay R1, and the power supply to relays R1 and R4 is unaffected by the opening of P1–2 since R5–1 and R4–2 parallel it and serve to close the circuit anyway. The action of relay R1 includes ignition and priming which adds the turbine's efforts in aid of the torque produced by the starters.

Perhaps before consideration of the operation is continued, it would be well to examine the construction of relay coils R3, R13, and R5. Relay R3 is a heavy duty relay actuated by the line voltage available. Relay 13 may be a small relay actuable by low voltage. Relay 5 may be a small relay actuable by a somewhat higher voltage although less than normal bus line voltage. Now a characteristic of this circuit is that if when in standstill condition the motors are thrown across the line, the potential level at the bus bars undergoes an appreciable sag. As the countervoltage of the machines rises, the voltage drop over the machines tends to increase and consequently to raise the potential at the bus bars. An application of the foregoing observations to the instant structure leads to this conclusion. As machines 23 and 24, particularly 24, gain speed and the countervoltage rises, the relay R13, set for low voltage, is actuated. Switch R13–1 closes the circuit to relay R3, while switch R13–2 opens to drop out relay R2. Switches R2–1, R3–1, and R3–2 change contact positions and throw starter motors 23 and 24 in parallel. Then as the rotating equipment attains speed where the starters are fast rotating, say for example, 8,000 R. P. M., and the countervoltage becomes appreciable, relay R5 may be actuated. Relay R5 causes relay R3, by means of switch R5–2, to drop out and to disconnect by switches R3–2 and R3–1, the starters from engagement. By its contacts R5–1, relay R5 also causes prime relay R1 to drop out and starter relay R4 to drop out. Relay R5 itself then drops out and normally closed switch R5–1 is allowed to close. Yet since switches R4–2 and P1–2 are open at this stage, there can be no more actuation of relay R4, which engages the starters, until such time as the machinery practically stops. Hence the starters will be afforded the safety feature again of being unengageable when once is the starting cycle completed and the engine running.

Curves have been prepared to illustrate graphically the foregoing operation; the following discussion applies to these curves.

Figure 7 consists of a graph showing torque behavior during part of the cranking speed range of the machinery. The initial torque delivered by the starters in series is represented by curve 1. Since, as stated, the terminal voltage of the power supply does not experience a radical drop due to the fact that the starters are in series and an extremely high initial surge of current is not involved, the torque will be seen to start off reasonably high and greatly in excess of the resistance torque offered by the engine, the latter values appearing on the graph as curve 3. Since torque has been chosen to be plotted against engine speed, the ordinate between curves 1 and 3 will be noted to represent the available torque for accelerating the machinery. Curve 1 blends into the curve 2 at the switchover point indicated, beyond which the starters are operated in parallel connection. So long as the starter torque curve is in excess of the resistance torque curve, an accelerating torque is available to increase the speed of the rotating machinery. It is to be seen that the ordinates of the crosshatched area *a* between a continuation 4 of the torque curve of the motors in parallel and the torque curve 1 of the starter motors in series represent the added torque made available to accelerate the machinery by virtue of the fact that the starters are initially connected in series. Curves 2 and 3 will be observed both to approach the X axis of the graph. Curve 3 actually crosses this axis and as the engine becomes self-sustaining in its operation commences to show a negative resistance. Curve 2 when extended only approaches the X axis and at some advanced phase of cranking operation where the beneficial torque contributed by the starters has become insignificant the starter relays are disconnected and the starters automatically dropped out of operation.

The graph of Figure 8 shows the starting cycle from the standpoint of horsepower considerations. The horsepower input to the starters is indicated by curve 6. Since it is desirable to utilize the available horsepower to its fullest, it is of advantage to have the curve 7, showing the starter output horsepower, lie situated as close as possible to curve 6. In the region where the starters are in series, the operation will be seen as to curve 7 to involve a peaking horsepower value whereafter the curve gradually falls off to the switchover point indicated. Then the starters begin to operate in parallel and continue to contribute by increasing amounts to the cranking horsepower being furnished. Point 5 indicates the point at which the turbine output horsepower just equals the horsepower input to the compressor. Curve 9, representing the horsepower input to the compressor, is ever exceeded by the output curve 10 beyond point 5, the situation then being that the starter output horsepower is utilized only to overcome the friction horsepower shown at curve 8 and to accelerate the engine. The turbine output horsepower will be observed to gain rapidly over the input necessary for the compressor and as soon as the turbine has established itself in self-sustaining operation, the starters are dropped out of the cranking engagement.

A different approach to this same situation is graphically brought out in Figure 9, which shows the variation in line current and shaft R. P. M. in the actual time sequence of the starting cycle. At curve 11 the line current, the starters being in series, will be seen to start off at a fairly high value and drop to a low enough point that the starter motor switchover becomes effective. Following switchover, which is represented by broken curve 12, the line current is passed through the starters through a parallel connection and as the acceleration and countervoltage increase, the line current begins to reduce. The line current will be observed, according to curve 13, to behave in an exact opposite sense to that of the shaft R. P. M. shown by curve 14. With the higher speeds the countervoltage of the starter motors will eventually reduce the line current to a small value and render their torque contribution to the machinery of small value. Then the starter relays will cause the starters to be disengaged and inactive prior to commencement of the next starting cycle.

As to Fig. 10, the structure of the priming unit 54 is shown. This priming unit is supplied from fuel tank 60 through the medium of boost pump 61 feeding into the supply line 120 of the prime unit. This supply line has two branches, of which branch 121 leads to the prime cylinder portion and branch 122 leads to the solenoid portion. The former portion comprises a prime cylinder proper 124 containing a piston 126, sealed as with the ring means 123, which operates inside the cylinder. In the left end of the cylinder may be positioned a spring 128 which acts in compression upon the piston 126. The small chamber 129 within the spring is so operated as at 127 and 130 to afford practically entire surface coverage to the piston upon that exposed face. The result is that if the fluid pressure on the face of the piston facing chamber 129 is the same as that pressure on the end of the cylinder 121 these pressures tend to neutralize one another and the piston will act upon the sole influence of compression spring 128 which will tend to expand and force the piston 126 away from the chamber 129. The fuel supply line 122 which leads to the solenoid portion is attached at valve housing 143. Within this valve housing is a solenoid comprising a valve end 134 and a spring end 140. This solenoid is drilled through in passageway 133 which communicates with a cavity in plug 144. Plug 144 is ported as at 141 and 136 such that if fluid pressure on the spring end of the solenoid is equal to the fluid pressure on the valve end of it, the two pressures will tend to neutralize one another. The spring 139 acting in compression on the spring end of the solenoid will therefore be unresisted and free to force the solenoid away from the plug. The prime cylinder and the solenoid are connected by line 131 leading out of the chamber 129, which line passes into the valve casing 143 which communicates with the discharge line 135. Placed in this discharge line is a one-way check valve which may be set, for instance, at a pressure of three pounds such that it will open upon being actuated by three pounds pressure to allow fuel to be expelled through line 138 which leads to the fuel system and fuel nozzles.

In regard to the operation of the structure of Figure 10, for the solenoid 132 to be in the position shown it must have been previously energized. The showing of the prime cylinder corresponds to the position taken upon the completion of the forward stroke, the piston having started from the opposite end of the cylinder, attained an intermediate position 126', and ended up its stroke in the position 126 shown. The capacity of one stroke of this prime cylinder may be, for example, of the order of one-quarter pound of fuel which fuel would be discharged through line 131 into valve casing 143 and on out through the check valve and discharge lines for the purpose of priming the fuel system. Upon completion of the starting operation the coil 101 is, in the normal course of operation, deenergized. Inasmuch as the net effect of the fuel upon the core 132 is more or less negligible, the coil spring 139 will serve to slide the core to the forward position 134' whereupon discharge line 135 is closed off. Whenever the valve 134 occupies the position 134', its necked down portion will allow the fuel supply line 122 to communicate directly with line 131 with the result that the fluid pressure on either side of piston 126 is of the same value. Accordingly, since the forces on either side of this piston tend to cancel one another out, the coil spring 128 may urge the piston back to its beginning position for the prime stroke and the piston remains in this position until the coil 101 is energized again. Upon being energized the coil 101 draws its core to the right, compressing spring 139 and storing potential energy therein. The pressure in chamber 129 and in the cylinder between it and the output face of the piston offers more or less unopposed resistance to any pressure coming from booster pump passage 120 and consequently fuel is discharged through line 131 and the open valve casing 143 to the discharge. Acting under the influence of the unopposed force due to the pressure in the line 121, the priming piston will move rapidly toward the left and will complete another priming stroke. This performance will cyclically be repeated upon each actuation of the solenoid coil 101.

Respecting Figure 11, the components should center around a normally balanced electrical bridge generally indicated at 140. The direct current supply to this bridge stems from source 90 indicated at the bottom of the diagram and is fed into two principal portions, one of which starts at point 146, and the other at point 148. From each of these points appropriate conductors lead through three resistors in series, which have terminals at grounded locations 166 and 168. The center one 152 and 154, of each of these three series resistors has terminals at either end where are provided taps with the other resistors shunted thereacross. In the case of resistor 154 the shunting resistor is designated 156; a slide wire 162 is provided intermediate the ends of resistor 156. On the other side of the diagram and corresponding to resistor 156 are three parallel resistors generally designated TR–SI, TR–L, and TR–CL, which are shunted around the resistor 152 at tapping points 142 and 158. These paralleled resistors are effective as temperature control setting resistors and serve to control the temperature maintained in the burners. Only a single one of the three resistors is in circuit at one time for operation to correspond to that of the resistor 156. All of the temperature resistors have taps at points along their lengths such as at 174, 182, and 198 which correspond to the slide wire 162 of resistor 156. Through the medium of conductor 151 these tapping points are connected and during balanced condition of the system there is no current flow in conductor 151. Slide wire 162 is peculiar in the regard that it is directly positioned by the metering needle setting as set by the fuel metering motor (motor 72 of Figure 1). As slide wire 162 is moved upward by the fuel motor, this fuel needle is at the same time permitting more fuel to flow toward the nozzles and accordingly tending to increase the burner temperature. Counterwise when the fuel motor is reducing the temperature in the burners by diminishing the fuel flow thereto this slide wire 162 is moved to a downward position. Incidental to the circuit set up by conductor 151 are a number of thermocouple means 36 which, as shown in Fig. 1, may be located one to each burner at a point upstream of the burner and connected in parallel with one another. This thermocouple device provides a self-compensating effect to the circuit and acts when heated to create an E. M. F. tending to produce current flow in the direction to the right in conductor 151. When current flows to the right in this conductor it causes the metering motor 72 of Figure 1 to position the slide wire 162 downward and further to decrease fuel flow. Thus as thermocouple device 36 registers increases in the temperature of the air going to the burner, the slide wire 162 tends to assume a position corresponding to a decrease in the rate of flow of fuel going to the burners to the end that the temperature in the burners is maintained substantially constant notwithstanding fluctuations in the intake air temperature. This slide wire 162 is related to the fuel metering motor 72 as follows. At any time there is an unbalance in the system such that current flows either one way or the other in conductor 151, the primary winding 149 of the transformer 155 feeding the fuel control amplifier 74 induces a current in the secondary winding 153 of the transformer which actuates the amplifier and causes the fuel metering motor 72 to operate. As previously noted, metering motor 72 is a rapidly responsive device and upon receipt of appropriate signals can reduce the fuel flow and cause a depression in temperature of the burners of the order of 500° R. to take place within about a one-second extent of time. As the fuel metering motor changes the position of the fuel needls, likewise is changed the position of slide wire 162. The operation of amplifier 74 may be such that for proper response alternating current is desirably impressed across the primary winding 149. Accordingly, in conductor 151 there is interposed, a secondary means 150 which could be, for example, a carbon microphone acting under influence of a primary winding 147 from the power source 90. The alternating current frequency fed into secondary means 150 may be of 400 cycle character. Thus when there is an unbalance in the system a series of actuating pulses tends to affect primary winding 149 and initiate changes of position of the fuel setting motor.

In Figure 12 the connection of metering motor 72 with the fuel metering control is shown in somewhat greater detail. Passages 173 and 175 form respectively, the metered and unmetered fuel passages of a fuel control of the air mass type completely described in the aforesaid copending application Serial No. 763,576, filed July 25, 1947, in the names of Vogt and Nims. Metering motor 72 drives through gears 177 and 179 a metering needle 171, which by virtue of its threaded stem is caused to move endwise for increasing or decreasing the effective area of fuel metering orifice 181. When metering motor 72 turns in a direction to call for increased fuel flow, needle 171 moves to the left increasing the area of the metering orifice 171 and allowing a greater flow of fuel from passage 175 to passage 173. Gear 177 also meshes with another gear 183 thereby driving slider 162 of the potentiometer 156 in exact synchronism for duplicating movement of metering motor 72.

The settings thus far discussed have been concerned primarily as respects apparatus having automatic action. Operation of the temperature rheostats of Figure 11 is a different matter. The resistor TR–SI may be seen connected at one side to tap 142 and at the other side to tap 158 so as to be shunted across the central resistor 152. The center tap on resistor TR–SI, shown at 174, is connected by means of the normally open switches I–4 and S–2 through normally closed switch B–2 to the thermocouple means 36 and conductor 151. Switch B–2 may be held in its normally closed position at one arc of range of the governor shaft, as will be described later, regardless of the position of the power lever. When this temperature resistor is in operation the other two resistors are desirably inactive according to the construction and arrangement of the control nets. The center temperature resistor TR-L has the one end connected to tap 142 and the other end connected to the tap 158 in the same manner as was noted in the preceding discussion relative to resistor TR-SI. To the contrary, however, resistor TR-L is provided with a slider 182 which moves in unison with the power lever. When the slider 182 is moved to the right in unison with the power lever such as would call for more power, the voltage level at point 180 would tend to fall below that of point 160 along the opposite resistor 158 such that a current flow would result in the direction to the left in conductor 151. Accordingly, the fuel metering motor calls for more fuel by moving the fuel needle and slider 162 is moved upward as the needle moves. On the other hand, if the slider 182 is moved to the leftward then the slider 162 would tend to move down under influence of the fuel motor and the metering needle would be so positioned as to decrease the fuel flow. The slider 182 is placed in the circuit only at such times as the landing switch RL-4, normally open, is closed and the "B region" switch B-2, normally closed, is closed. The topmost of the three temperature resistors is designated TR-CL. This resistor is tapped at points 142 and 158 in the same fashion as were the other two temperature resistors considered; tap 198, intermediate the length of resistor TR-CL, is connected to conductor 152 either by switch RC-3 or by switch B-2. Switch RC-3 is a "cruise" switch adapted to be closed upon preexistence of a cruise condition in the system. The switch B-2, normally open so as to keep tap 198 in an open circuit, is closed only upon the movement of the power lever into the "B region." Resistor TR-CL may for convenience be provided with end portions 194 and 196. These end portions are arranged to be effectively shorted out for certain switch positions in the condition network. For example, the portion 194 will be shorted out when the switch CI closes, switch CI assuming closed position when the power lever is in the "cruise idle" position. When the overspeed contact G-1 (Fig. 3) closes so as to energize solenoid R-9, the relay contact R9-5 (Fig. 8) will close to short out portion 194. The result of shorting out this portion 194 is such as to raise the voltage level at point 190 in resistor TR-CL relative to point 160 and the consequent current flow to the right in conductor 152 will bring about a temperature decrease in the burners. For convenience sake, the effect of the shorting out of this portion may produce by proper calibration of portion 194, a depression in temperature of about 100° R. at the burners. An opposite result is reached when the portion 196 is shorted out. The switches effectuating the latter situation are switch HS, which is closed when the power lever is moved to the military setting, and switch R10-3 which is closed when the underspeed contacts G-2 (Fig. 3) close to energize relay R-10. Closure of either of these switches will eventuate an unbalance in conductor 152 in an opposite direction to the one just considered such that current will flow to the left and cause the fuel metering motor 72 to increase the flow of fuel for the burners. Portion 196 may be pre-calibrated to afford, as for example, an increase in the burner temperature of 100° R. If one of these end portions 194 and 196 happens to be active at a time when the other has been shorted out and then the situation is instantaneously reversed such that the former switch is rendered inactive and the latter is activated, a simultaneous demand for a temperature change of 200° R. in the burners is registered. Since the response of amplifier 74 is substantially instantaneous to the demand and since the response of metering motor 72, as previously noted, consists in duration of about a one second's interval for producing a 500° R. temperature change in the burners, then the burner response will be complete in considerably less than a second. The advantage of this behavior will become more apparent from a consideration of the succeeding paragraphs. When the entire resistor TR-CL is in operation so as to call for the temperature setting in the burners the temperature maintained there may be preselected to be, for example, of the order of 1960° R. The operation of these circuits is set forth in detail below.

The operation of the assembly shown in Fig. 11 is as follows. During the starting cycle, which has already been discussed in preceding sections, the first step related to setting the condition lever in the "stop" position, the power lever being impotent at the time. Switch S-2 then closes, placing in operation the temperature resistor for "stop-idle" TR-SI. The slide wire for this resistor may be fixed at point 170 and serves primarily to keep the temperature setting from "floating" at this preliminary stage. The thermocouple device 36 upstream of the burners may be expected to be cold and productive of little or no electromotive force. The potential level at point 170 of TR-SI, due to the relatively small active resistance offered by portion 172, may be expected to be considerably lower than at point 160. Accordingly, current flow in conductor 152 may be expected in the direction to the left whereupon the fuel motor will cause the metering setting needle and slide wire 162 to move upward and promote an advanced fuel flow. Such flow may be what normally corresponds to a nozzle box temperature of 1960° R.

Movement of the condition lever to "idle," attended by the opening of switch S-2 and the closing of switch I-4, serves to maintain the previous status quo and keep the temperature control from "floating." The starting cycle then begins and progresses to a point where the engine speed reaches, for example, 8,000 R. P. M. as hereinbefore noted, at which time the ground idle solenoid acts to disable the control of amplifier 74 over the fuel metering function. The temperature rheostat control system is then left inactive although in a stabilized state.

The center resistor TR-L of the three temperature resistors may be operated by the power lever 86 to set the burner temperature after the "land" condition has been set by the condition lever, provided however, that the former is kept out of the "B region." Normally, during the "land" condition, open switches I-4 and S-2 cause resistor TR-SI to be inactive, and the land switch RL-4 operates to make resistor TR-L the active resistor. However, this situation exists only so long as the switch B-2 is in its downward position such as is indicative that the power lever is out of the "B region." Slide wire 182, moving with the power lever serves to act the temperature in the nozzle boxes according to the manually selected position of the power lever.

The uppermost of the temperature resistors is TR-CL, which makes a temperature setting in the burners for all other contingencies: that is, with the condition lever in "land," TR-CL sets temperature when the power lever is in (1) the "B region"; with the condition lever in "cruise," TR-CL sets temperature when the power lever is in (2) "cruise idle" (CI), (3) in the power control range, or in (4) "military" (HS). These four contingencies will be considered separately.

In contingency (1) noted, "land" and "B region," the arrangement of the circuits is peculiar in that the governor maintains a constant arbitrary speed, the angle of propeller pitch, as discussed hereinbefore, depends upon the position of the power lever, and the switch B-2 is in its upper or actuated position. The pitch angle variation may include the range between minus twenty degrees and plus ten degrees and the constant propeller speed may arbitrarily be one such as will absorb, for example, 60% of the full engine power at a minus twenty degree angle of blade setting. When the propeller is turning over at the foregoing predetermined constant speed, the voltage level at point 190 may be such as to call for a metering needle setting and consequent slide wire 162 position corresponding to a temperature of about 1960° R. in the burner. Should the speed drop 500 R. P. M. below that speed for which the governor is set, underspeed contact G-2 will close (Fig. 3), and then underspeed relay switch R10-3 will be caused to close and short out portion 196 of resistor TR-CL. The voltage level at point 190 will then drop relative to that of point 160; consequently current flows to the left in conductor 152 and the nozzle box temperature will increase due to the resulting addition to the rate of fuel flow. The net temperature increase will be of some suitably selected value as 100° R. A 500 R. P. M. overspeed condition eventuates a vice versa effect, namely, relay switch R9-5 will close and occasion a temperature decrease of, for example, 100° R.

As to contingency (2), "cruise" and "cruise idle," switch RC-3 will be closed and keep resistor TR-CL the active resistor. Due to the "cruise idle" setting of the power lever, switch CI will desirably be kept closed to maintain a depressed temperature in the burners. If the normal temperature happens to be 1960° R. and the portion 194 has been so calibrated to decrease the temperature 100° R. then the ensuing temperature will be of the order 1860° R.

In respect to contingency (3), "cruise" and "power control range," the temperature may be the normal cruise value, 1960° R., for example, and the efforts of the power lever will be directed toward setting the governor.

In regard to contingency (4), "cruise" and "military" (HS), relay switch RC–3 will be closed as will be switch HS–3. The temperature in the burners will then be increased in value about 100° R., which when added to the operating temperature of 1960° R. will yield 2060° R. total temperature.

In respect of Fig. 13, the effect of substituting a non-linear resistor TR–CL' and slide wire 192 for the linear resistor TR–CL of Figure 11 is shown. The rest of the circuit, it is to be understood, remains the same. Where the effect of this change will be reflected occurs when the condition lever is in the "cruise" position and the power lever is in the "power control range." The power lever is connected in this eventuality to the setting mechanism for speed governor. In addition, slide wire 192 may be attached so as to move in response to change of the setting of the power lever. Thus in the intermediate positions the power lever will travel along the low resistance conductor portion 191 and not appreciably affect the burner temperature; where the control by the power lever would be felt directly would be only as regards the governor speed setting. Upon approaching the limits of its "power control range" however, the power lever would cause slide wire 192 to contact either portion 193 or 195 of the resistor portion and to begin gradually removing resistance. Then the temperature called for would either be of increasing or decreasing character as the case may be. When the power lever reaches the boundary positions "cruise idle" or "military," in place of the gradual change of temperature setting there would follow an abrupt and marked change as called for by switch CI or HS whichever was affected. This marked change would amount to the proportion of the 100° R. previously noted.

In consideration of Fig. 14, there is shown a governor and its controlled and controlling apparatus. This governor 16 is supplied by power source 90 through a suitable lead 93. Also as applies to the input side of the governor provision is made to transmit from a speed indicating means 200 a speed signal indicative of the actual engine speed. Additionally connected to the input side of the governor may be seen a unified power unit 80. As to the apparatus controlled by the governor, at 12 there may be seen a propeller pitch control which contains operating solenoids by which the propeller blade angle can be either increased or decreased. Also within this control 12 is a low pitch stop disabler 110 for the propeller. Another piece of apparatus controlled by the governor may be seen at 64, the fuel governor bypass. This bypass by means of solenoids 272 and 274 can regulate to a degree the fuel supplied the engine. Controlled also by the governor are relay coils R9 and R10, which are operated by the contacts G1 and G2 respectively. Contacts G1 and G2 though spaced on either side of switch 206, are still close enough together for one or other to be affected before the governor becomes pronouncedly underspeed or overspeed. Not only are some governor controls operated by the switch 206, but others are operated by governor switches such as 201 and 205. These latter are arranged to operate to give effect progressively, as by rheostats shown respectively in conjunction therewith, on the connections 207', 208' and 209' leading to pitch control 12 and bypass unit 64 whereby the degree of actuation is proportional to the degree of underspeed or overspeed. That is to say, switch 206 operates positively and completely upon the entry of the governor into overspeed or underspeed status, whereas switches 201 and 205 only commence operation of their associated apparatus and the ensuing rate of activity will depend on the extent of the underspeed or overspeed then in existence. This behavior will be later elaborated on as to the advantageous action it affords.

The governor 16 is represented schematically to contain flyball 203. This showing is purely fanciful, however, since the governor may be of the electromagnetic or electronic type. Whatever its particular construction this governor is primarily a device responsive to speed for the purpose of regulating the latter. Such apparatus is of the type commercially available and while the internal wiring may be conventional, the circuits associated with the external posts of the governor box shall be arranged to take into account certain basic considerations as contemplated by the power plant of this invention. In effort to set up the basic situations under which this governor must operate, the problem must be approached from two aspects. One aspect is that for such machinery as is the instant invention the speed is proportional to a number of variables, two of which are fuel flow and propeller pitch. As the fuel flow increases, the speed naturally tends to pick up and as the propeller pitch is flattened the speed likewise tends to pick up. However, if these two variables are changed so as to oppose one another, as for example, the propeller pitch is increased when the fuel flow is increased, the speed may be maintained at a constant rate. Another aspect, to be considered as peculiar to the particular machinery here involved, is that the power lever is to serve in a dual role when it is operating and is to be sterilized in another condition of operation of the machinery. With these two aspects in view, it is an easy problem to tabulate the various situations to which the governor must react. The first situation is that in which the power lever sets the propeller pitch directly through pitch control valves in the pitch control 12, Figure 14, in which a cam actuated by the power lever in the "B region" sets the governor for a fixed speed, and in which the governor may adjust the fuel flow to meet the speed demanded. The second situation is occasioned when the power lever is out of the "B region" and in the "governing range" such that the power lever indirectly sets the fuel flow, the speed resistors set the governor for the speed called for, and the governor by regulating the pitch makes the speed be appropriately correlated to the fuel flow. This latter function is made possible by governor controlled solenoids which can influence the position of the aforementioned pitch control valves unless overridden by direct pitch setting action of the power lever. The first two situations take care of the two major active positions of the power lever and represent two different statuses for the governor. The third situation represents the transition period between the second situation and the fourth situation. In the fourth situation the power lever is rendered sterile and the status of the governor is that of ineffectiveness. In this last situation the speed is not regulated at all inasmuch as was explained in connection with Fig. 3, the speed resistors set the propeller in flat pitch, the ground idle solenoid reduces the fuel flow to the amount necessary to idle and the propeller speed settles down at the point where the load of the propeller just absorbs the power produced by the reduced fuel flow. To return attention to the governor 16, power control box 80 may be seen to comprise a portion indicated in dashes at 220. Portion 220 is devoted to containing the speed resistors and is shown to an enlarged scale in the right hand part of Fig. 14; the speed resistors are related to the governor through the medium of a governor actuator 18. These two last mentioned components, the speed resistor unit and the actuator unit, are centered around a polarized relay PR which is located at the center of an electrical bridge. This bridge is supplied from power source 90 through lead 202 and is grounded at the top of the diagram at 204. The left hand portion of this bridge comprises a resistor 218 while the right portion of the bridge comprises three resistors in parallel, SR–I, SR–L, and SR–C. In effect all of the four named resistors are in parallel to the ground 204, yet during operation only one of the resistors in the right hand portion is active at a time. When the voltage level at point 210 is the same as the voltage level at 230, 233, 240, or 250, as selected, the system is in balance. However, depending on which one of the three resistors of the right portion is in active operation, when the tap of the effective resistor has a potential higher or lower than the tap at point 210, electric current will be caused to flow between the connected tapping points either from the right portion to the left, or from the left portion to the right. The resistors of the right portion are manually selected for individual operation by the operator through appropriate positioning of condition lever 84. Thus when the "cruise" condition is set, the condition lever causes the "cruise" switches to operate; accordingly switch C–3 closes and calls into active operation the speed resistor for cruise, SR–C. When the "land" condition is set, land switch L3 may be expected to close whereby the speed resistor for the land condition SR–L, becomes actively engaged in the circuit control. Lastly, when the "idle" condition is set such that switch I5 closes, the speed resistor for the idle condition, SR–I; becomes activated. In any case, an unbalance between the active resistor on the right and the resistor 218 in the left portion will bring about a current flow through polarized relay PR. The relay bar 215 will move in one direction or the other to close either switch PR–1 or PR–2 and energize selectively the field coils 266 and 268 of motor 260. This electric motor 260 may be mounted on a shaft 262 and so wired as to rotate in either direction. When coil 266 is energized the motor may rotate in one direction and vice versa for field coil 268. This actuating motor may be of any conventional relatively slow-operating type and is shown for diagrammatical purposes, as being a series wound machine. Coming out of the rotor of motor 260 is a shaft 264 to which is connected the slider 216 of slide wire 218. The shaft 264 and slide wire 216 are so interrelated that when the shaft assumes any particular position, the slide wire takes a corresponding position along its resistor 218. When an unbalance is effectuated in the circuit such as, for example, when the slide wire 252 of resistor SR–C is moved to the right, the voltage level at point 250 immediately drops below the existing level at point 210 of the resistor 219. Current then tends to flow to the right through relay PR and to cause an appropriate set of contacts to be closed by the bar 215 such that motor 260 will move slide wire 216 up along the resistor portion 212 in order to strike a balance between the voltages and maintain a no-current condition in the polarized relay. The net effect is that a change of the voltage level of any active tap in the three right hand resistors is reflected in the fact that motor shafts 264 move an appropriate amount for reestablishing equilibrium. These varying voltages are manifested then in the relative position of shaft 262 which may be seen to lead from the opposite end of motor 260 into the governor 16.

When the power lever enters the pitch control of "B region," it actuates a cam and switches which bring the speed setting of the governor to a constant predetermined value. This value may be an arbitrary one of the order of 15,000 engine R. P. M. or any such figure which will yield at a minus twenty degree propeller pitch setting an engine reverse thrust sufficient to absorb 60% or thereabouts of the rated power of the engine.

Prior to a consideration of the circuit operation regarding Fig. 14, it is probably in order to present certain peculiarities of internal construction and behavior of the components of the diagram. To begin with, a few basics in prime mover characteristics, particularly as regards turbines, might well be kept in mind. An analysis of the torque curves as plotted against speed or air flow through the turbine, for such machines and the propellers they drive, reveals that in the normal cruise range the operation may be naturally unstable. Accordingly, one stabilizer or dashpot may be provided for the control changing the fuel flow in order to limit the speed of change of the rate of flow. This device was noted in connection with the discussion of Fig. 4 preceding. A second stabilizer may be used with the propeller pitch changer to limit the maximum rate of change. Furthermore, in the cruise condition a low pitch stop may be desirable to assure to the system at least some load at all times on the power plant and thus prevent the machine from running away with itself. An emergency in which the machine might run away with itself conceivably exists, for example, in the case where the entire governor unit collapses.

However, in operating conditions other than cruising, these devices may not be necessary and may be desirably rendered inactive. For example, at a high speed of operation which is beyond the cruising range, the machine is inherently stable and accordingly no dashpots are needed to stabilize the fuel flow. That is to say, the propeller pitch does not hunt at these advanced speeds and the fuel control does not tend to hunt. Such an analysis will follow upon a detailed consideration of torque behavior of such kindred machines. An instance of where propeller pitch changes may be effectuated without limit as to rate is offered by the peculiar design situation encountered in the instant machine. One of the premises on which this machine has been built is that in the "B region" of operation the pitch must answer immediately to signals from the power lever and without delay. Hence neither the first or second noted stabilizer is desirably operable at all times. The low pitch limit for the propeller, which functions to keep the engine from running away with itself at cruise or advanced speeds, serves no useful purpose in the idling condition. Where a flat pitch at idle condition is of advantage then the low pitch stop must be removed and the engine may turn over with little or no load on it. All the foregoing devices must be placed into active operational status at the proper time and then kept inactive at all other times. For the coordination of the system and the proper selection of the kind of pitch control, the governor is primarily responsible.

Respecting the internal wiring of the governor 16 of Figure 14, the governor may be adapted to operate in conjunction with shaft 262. The travel of this shaft may be divided into two operating arcs which roughly correspond to settings of slide wire 216, first in the region 214 of resistor 218 and secondly, in the region 212 of resistor 218. In the region 212, which is indicative of a control signal demanding higher speed and which happens to be out of the B region, the arc in which shaft 262 is operating may be such that it changes the governor setting as by varying the spring tension on the figurative flyballs. Such an area of operation corresponds to the second situation considered under which the governor must operate. When slide wire 216 is in the area of resistor portion 214, the arc of action of the shaft 262 re-arranges the controls within the governor. The effect is that this second arc of travel is divided into degrees of propeller pitch setting rather than engine R. P. M. and the motor operates directly to set the propeller pitch through pitch valves, not shown. The switches B–4 and B–5 may be seen selectively to connect terminals 208′ and 209′ either to the propeller pitch control 12 or to the fuel governor bypass unit 64. The supply terminals 208′ and 209′ are so connected internally in the governor circuits that as the propeller goes off speed, the terminals mentioned may be energized through certain proportioning resistors by members 201 and 205. Thus when underspeed, the underspeed terminal 208′ is energized through switches 201 and 205 by an amount proportionate to the degree of underspeed; when overspeed, the overspeed terminal 209′ is energized through switches 201 and 205 according to the extent of overspeed. For the position of the controls as shown, these terminals tend when energized to cause decrease or increase of the pitch of the propeller by being connected through suitable terminals, respectively 208 and 209, on the solenoid pitch control 12. The control 12 operates normally to position the propeller pitch valves, not shown, but are subject to the overriding pitch setting function of the power lever in the B region. In the first situation which was considered for operation of the governor, namely, when the power lever is in the "B region," the switches B–4 and B–5 are actuated such that the fuel governor bypass may be controlled directly by the governor 203. The arc for the speed setting shaft 262 is such as to operate mechanically upon certain propeller pitch setting control valves, not shown. The signals from the speed setting shaft 262 may thus be reflected directly in a change of position of propeller pitch. This shaft may be provided with a cam having an extended nose whereby whenever an arc of travel is assumed which corresponds to that along resistor 214 by slide wire 216, a contact is made and maintained to keep the governor set at a constant predetermined value. This value is, of course, arbitrary and may be of the order of 15,000 R. P. M. or any such value which will yield at 1960° R. engine temperature an engine power equal to 60% of the full power rating. The pitch setting control valves, not shown, which were mentioned above, may be so arranged with the solenoids in propeller pitch control 12 as to override and nullify them mechanically. The consequences are evident. In the so-called normal range of operation there is no conflict inasmuch as the shaft 262 sets the governor and the governor sets the pitch. In the "B region" range there is no conflict since the switches B–4 and B–5 are thrown downwardly; the governor at constant setting controls the fuel governor 64, the pitch solenoids are open circuited, and the shaft 262 controls the pitch through the medium of its pitch setting control valves, not shown. The compromise area, in which there otherwise would be a conflict, is occasioned during starting or idling when zero pitch is called for by the speed resistors. The governor in over- or underspeed status may call for a change in pitch through the pitch solenoids; yet the shaft 262 and its pitch setting control valves, not shown, operate to ineffectuate the action of the pitch solenoids. Hence the governor signals are reflected in appropriate operation of the pitch solenoids for all conditions. Whether or not this operation is taken advantage of depends, of course, on the position of shaft 262.

In reverting to the speed resistors SR–I, SR–L, and SR–C, the switches associated therewith are to a great extent controlled in accordance with the position of the condition lever. Such switches under its cognizance are R–5, L–3, and C–3. The slider 252 of resistor SR–C may be mounted on the power lever and move with it. When the slider 252 is moved to a position to the right of that shown—i. e., along portion 256 of resistor SR–C— the power lever is then afforded control over the speed of the machine and the active arc of travel of the speed setting shaft 262 corresponds as to time of appropriate operation to the portion 212 of resistor 218. When the power lever is in its "B region" on the other hand, the slider 252 is operating in the area of resistor SR–C such as determines the propeller pitch setting directly and the speed setting shaft 262 takes an appropriate position as regards its arc of action for directly setting the pitch control valves.

As regards the lowermost of the three resistors in the right-hand portion of Figure 14, resistor SR–I operates as a function more or less of the idle switch I–5. To reach the idle condition the engine must be brought either up from a standstill condition or else brought down from a "cruise" condition or a "land" condition. As has been stated in the previous detailed consideration of the starting cycle, during the start from a standstill relay R–6 is actuated such that switch R6–5 assumes its leftward position. As to the approach to the idling condition from the high speed side, the switch circuits are so related that relay R–12 is actuated when the engine reaches the idling state in that manner. Thus from whichever side the idling condition is approached, either the relay R–6 or relay R–12 causes the zero pitch tap 233 to be connected in the speed rheostat circuit so as to position the slide wire 216 in accord therewith. This idling condition can be attained regardless of the position of the power lever if the turbine is brought up from a standstill condition for the reason that as soon as the zero pitch signal causes the shaft 262 to rotate down into the arc indicative of appropriate operation of resistor 214, the speed setting shaft 262 has direct control 110a in the pitch setting valves of the propeller pitch control 12. To achieve the "idle" position from a high speed status may not be done, however, with the power lever in the "B region" since switch B3 must be released before the relay R12 can set the propeller in zero pitch.

As to the operation of the device in Fig. 14, each phase will be considered with respect to the appropriate one of the four situations noted in the connection with the operation of the governor. In the first situation, which was one of the active operating positions for the power lever, a cam, not shown, actuated by the power lever in the "B region," set the governor at constant speed. It must be remembered that the power lever is only active when the condition lever has brought up the machine to idle status and then been advanced either to a "cruise" or to a "land" position. When the power lever is in the "B region" switch B3 is closed and, notwithstanding the condition of the condition lever, whether in the "cruise" or the "land" condition, a circuit is completed through resistor SR–C which puts the pitch control directly under control of slider 252 which is positioned by the power lever. The position of slider 252 is reflected by the angularity assumed by shaft 262. The pitch then depends directly upon the shaft position. Meantime the B region switches B4 and B5 will have operated such that the governor 203 through contacts 208' and 209' is controlling the fuel governor 64 and thus controlling fuel to maintain constant speed. The pitch angle varies directly with the desires of the pilot and is controlled by the power lever. In the second situation considered for the governor, the switch B3 is restored to its normally closed position and the particular speed resistor effected will depend upon the position of the condition lever. Nevertheless one or the other of these speed resistors SR–C or SR–L will set the speed setting shaft in an arc of travel appropriately indicative of activation of portion 212 of the resistor 218. Meantime switches B4 and B5 will have been restored to their normal position since the power lever has quit the B region and the governor thus resumes control of the speed by means of propeller pitch control 12 and the pitch valve regulating solenoids. The shaft 262 is in its arc of travel which permits it to cause change of governor speed setting and act in response to the speed resistors. When this portion of the arc is active, the switches 201 and 205 are connected through their conjoined rheostats to control the pitch setting control 12 for the propeller. The motor 260 which swings shaft 262 through the aforesaid arc has been described as being of a slow type. The time required for the motor to effect the noted swing of the shaft 262 may be of the order of five seconds, with the governor correspondingly going gradually into an underspeed or overspeed status and the pitch of the propeller being changed by a rate dependent on the degree of underspeed or overspeed that the governor attains. Switch 206 on the other hand, completes the appropriate circuit through contacts G1 and G2 as soon as the governor is off speed 500 R. P. M. Thus when additional speed is called for as incident to appropriate governor setting, the relay R9 or R10 is affected and brought into full activity while the pitch setting efforts based on the extent of overspeed or underspeed of switches 201 and 205 are activated only to be degree of overspeed or underspeed. The third situation considered was the transition from the second situation just outlined to the ground idle status which was arbitrarily called the fourth situation. In this third situation the power lever must have been moved out of the "B region" in order to restore switch B3 to its normal position. Switches B4 and B5 will also be restored to their normal position and the governor will control the propeller pitch. At this transition speed the relay R12 will not be energized and neither will the relay R6 with the result that switch R6–5 will be in the position shown and switch R12–4 will be in the position shown. With the condition lever in idle condition the switch I–5 will close. The voltage tapped off at point 230 in resistor SR–I corresponds roughly to 11,000 engine R. P. M. for example. Forthwith the overspeed contact in the governor will close when speed setting shaft 262 tends to move slide wire 216 down along resistor 212 and the engine will be slowed down due to an increase of propeller pitch. When the engine reaches the speed called for (11,000 R. P. M.) the overspeed contact in the governor will open. At the same time, as will be explained later more in detail, will be actuated switch R12–5. Switch R12–5 therefore shifts to the left and calls for a zero pitch setting of the speed setting shaft 262. This speed setting shaft will then be positioned into its second arc of travel whereby it controls directly the propeller pitch. With the propeller set in flat pitch the engine will slow down due to a reduced ground idle fuel flow and will settle down to a speed of, for example, 9500 R. P. M. In this ground idle condition, which was noted as the fourth situation, the power lever is unavailing and the governor is switched over to the fuel bypass control where the governor has no effect over the engine, and the speed balance is reached when the flat pitch load of the propeller at, for example, 9500 R. P. M. is just carried by the ground idle fuel flow. This fourth situation can equally well be reached from a condition of standstill of the engine. The operation is much the same inasmuch as during the starting cycle relay R6 is energized at a low speed and relay switch R6–5 is moved to the left such that a zero propeller pitch setting is called for. As soon as the shaft 262 takes up a corresponding position the pitch setting function is acquired by the speed setting shaft 262. In this second arc of travel the speed setting shaft also closes switches B4 and B5 independently of the position of the power lever and shifts the governor control over terminals 208' and 209' onto the fuel governor bypass 64.

In Figure 16 is to be observed a graph which shows the scheme of operation of the governor discussed in Figure 14. Emphasis has already been laid on the point that the governor controls the rate of change of the propeller pitch such that the latter varies in magnitude with the relative amount by which the governor is running underspeed or overspeed. The change in setting of the governor, which change produces the underspeed or overspeed, will be applied gradually since as noted the motor 260 is of relatively slow speed operation. Relays R9 and R10 are positive acting in nature and operate as soon as the governor begins to enter an out of speed status and then cause the sensitive and fast acting amplifier 74 of Figures 11, 12, and 13 and regulating motor 72 of Figure 1 to institute a rapid change of temperature in the burners. The results of this coordinated action are borne out graphically in Figure 16. The curves shown represent the torque characteristics of a propeller loaded gas turbine operating at various speeds. The curves which incline upwardly are representative of propeller operation for fixed blade angles of the propeller and display the characteristic that the torque varies as some greater-than-unitary power of the speed. The blade having the higher pitch is, of course, the blade producing the more torque for any one speed. The curves which tend toward the horizontal are the engine torque values for any constant temperature burner operation over a range of speeds. It is common knowledge that in control systems of this type, for a given operating temperature T the governor may be adapted to manipulate the propeller pitch into an appropriate angle B at which a stable speed of operation, $N$ R. P. M., results. With the arrangement as previously disclosed, a signal for a speed reduction to a value $N-6,000$ R. P. M. is manifested in the respect that motor 260 of Figure 14 begins its relatively slow movement and gradually applies a change of governor setting. The propeller pitch will be seen, in passing through path 1 from point $a$ to $d$, to be gradually increasing toward the progressively higher values $B+2°$, $B+4°$, respectively to provide the needed load at the operating temperature T under the lower speed condition $N-6,000$ R. P. M. The action of the switch 206 and relays R9 and R10 of Figure 14, and the resistors and amplifier 74 of Figure 8 is on the other hand instantaneous with the commencement of change in governor setting. Hence the fast moving fuel regulating motor 72 of Figure 1 is practically of instantaneous response to drop the burner temperature. It follows, as respects Figure 16, that a rapid drop in operating temperature to point $b$ on line $T-100°$ transpires before the pitch angle has increased appreciably if at all. Thereafter the propeller pitch is free to increase from point $b$ to $c$ to $d$ and such as to overcome a substantially reduced torque for rapidly slowing down the engine to the new speed $N-6,000$ R. P. M. Thereby is avoided the dangerous situation occasioned by a relatively rapid system of application of propeller pitch whereby the torque would experience an overall rise as illustrated by path 2 of graph, Figure 16. The end result is, of course, the same in both paths, but in path 2 a dangerous overload of torque would be momentarily imposed onto the drive mechanism and a more significant torque would be necessary to be overcome by the propeller in order to slow down the machinery. No overload torque at all is occasioned during travel along path 1 and moreover the resistance torque of the propeller required to decelerate the machinery is augmented in effect by the fact that the torque of $T-100°$ is easier to countervail than the greater torque of T operating temperature.

As to the particulars of the device shown in Figure 15, the control circuits are essentially the same as those of Figure 14 but with one slight modification in a speed resistor. The speed resistor box 220 resembles the previously described speed resistor box except that the middle resistor SR–L' has been fitted with a slide wire 248 which moves directly with the power lever. The resistor SR–L' consists of a linear resistance portion 247 and a straight slide portion 249. This non-linear resistor SR–L' is so arranged that if the slide wire is moved within the region 247 a change of resistance will be effective and a change of voltage at level 240 will result. However, if the slide wire is moved in the region 249 the voltage level at 240 will remain the same despite the subsequent position changes. It will be apparent from the construction just set forth that in the "land" position a speed control over the system is afforded the power lever in the lower reaches of its "land" positions while in the upper reaches of the "land" position an unvarying maximum speed will be attained at portion 249 and no increase will be possible therealong. In the embodiment shown in Fig. 14, during the "land" condition the speed was arranged to be maintained constant at say, for example, 17,000 R. P. M. but in the embodiment of Fig. 15 while the limit for the speed will be 17,000 R. P. M. for example, lower speeds may be attained by a retarding motion of the power lever.

As to the structure of Fig. 17 a structural diagram is presented of the fuel governor bypass 64 which was discussed in connection with Fig. 14. This bypass arrangement is used to adapt such a governor as 16 to its speed regulating function such that the alternate control governor can exert its influence through change of fuel flow to the engine in addition to change of propeller pitch setting. Coils 272 and 274, as discussed previously, operate to increase the fuel or decrease the fuel respectively and act in conjunction with switches 201 and 205, the proportionate rheostats shown in conjunction with the switches 201, 205 and the contacts 208' and 209' of control governor 16. These coils 272 and 274 control solenoid valves 282 and 292 which regulate the amount of bypass called for by fuel governor 64. Valve 282 has a relieved area 286 which can permit communication between lines 290 and 299, and operates to assume a normal position as shown, and another position by which the relieved portion is brought into registry with a supply port 276. At the upper end of valve 282 may be located another relieved portion 284 which normally dead ends the line 288 but when in the upward actuated position allows the line 288 to communicate with the drain line 280. Companion valve 292 is arranged in much the same fashion. Conduits 298 and 299 leading from the solenoid valve chamber feed into opposite sides of a cylinder 300 which contains a free piston 302. This piston positions, by means of a rod 308, a bypass valve 310 which is located in conduits 65 and 67. Conduit 65 communicates with the metered fuel passages supplying the turbine burners. Conduit 67 is a drain bypass which as an examination of Fig. 1 will show, causes reentry into the inlet side of the transfer pump 63. Transfer pump 63 is in the main fuel system and delivers fuel into the fuel metering control. Valve 310 is arranged to obstruct the bypass and allow either more or less metered fuel to reach its final destination in the burners.

As to the operation of the fuel governor of Fig. 17, the actuating fluid for it is supplied through conduits 278 and 276. The actuating fluid may consist of fuel taken from the main fuel system, or it may be hydraulic fluid, oil, or any other convenient solution which operates satisfactorily as hydraulic operator. The fluid is admitted through appropriate operation of cross valves 282 and 292 to act in hydraulic muscle chamber 300 and then is discharged through a drain line 280 common to both the aforesaid valves. Specifically, let be considered the situation where the overspeed solenoid 274 acts. Solenoid 274 will tend to decrease fuel supplied to the engine. When actuated, solenoid 274 draws upwardly the rod connecting it to the solenoid valve 292. Relieved portions 294 and 296 of the solenoid valve move up the valve to register with the fuel supply line 278 and with the drain line 280 respectively. The motivating fluid 278 then is admitted into the chamber formed by relieved portion 296. There is no path of escape offered by crossover conduit 288 since valve 282 acts as dead end. Fluid, however, may pass from the relieved portion chamber 296 through a so-called work port into conduit 298 and then into side 306 of hydraulic chamber 300. Piston 302, acted on by an unresisted force in the chamber 306, tends to move to the right, increasing the amount of bypass of fuel destined for the engine and decreasing the net fuel supplied it. As piston 302 travels to the right, the fluid contained in portion 304 is discharged through conduit 299 and the work port at the end thereof into the chamber formed by relieved portion 286 of solenoid valve 282. The fluid is then passed through cross conduit 290 and into the chamber formed by relieved portion 294, which latter has been brought into registry with the outlet port to drain 280. The fluid then originally introduced through the inlet ports adjacent conduits 278 and 279 and transiently confined in the interconnected passages is thus permitted to be dumped in drain conduit 280. An inspection of course will reveal that when valves 282 and 292 are simultaneously moved open, crossover conduits 288 and 290 serve to pass fluid directly from the inlet ports to the outlet ports and drain at 280. The piston 302 provides smooth and easily controllable action for setting the bypass valve 310 and allows the governor under certain conditions to aid in regulating the fuel supplied to the engine.

Overall operation

The component parts of the apparatus represented by Figures 1–17 have each been described more or less as separate units. Their responses to various signals have been treated as somewhat isolated and individual. Yet by means of relays and interrelating controls these units may be pieced together to form a complete operating picture. Their cooperative functions will follow as to the various phases of the operating cycle.

Starting cycle—"stop" condition set

It will be recalled from the discussion in connection with Figs. 1 through 6 that at the outset of the starting cycle relay R6 may be actuated. This reaction is to movement of the condition lever to the "stop" position. Contacts R6–4, through disabler 110, cause the low pitch stop to be removed. Contacts R6–2 close to prepare a circuit to relay RC. The speed resistor net, Figures 14 and 15, responds when contacts R6–5 operate, to call for zero pitch setting whereupon setting shaft 262 moves into the arc affording direct control over the propeller pitch angle and zero pitch may be set. In this arc of travel, the shaft cam operates switches B–4 and B–5, Figure 14, to shift governor control from cognizance of the propeller pitch to the function of regulating fuel governor by-pass 64.

The temperature resistors, Figures 11 and 13 may react at commencement of the starting cycle by, as a result of the closing of "stop" switch S–2, the resistor TR–SI setting the fuel metering needle at a point calling for a temperature of 1960° R. Thus at the outset the propeller may have been set in flat pitch and the fuel flow automatically set at proper value.

Same—interrupted advance to "cruise"

Movement of condition lever 84 to "idle," the intermediate position, will be reflected in the area of the temperature resistors, Figures 11 and 13 simply in that switch I4 instead of switch S2 is the switch which keeps resistor TR–SI in the position of active control. As to the speed resistors, Figures 14 and 15, idle switch I–5 may close simply to prepare another circuit for the active resistor SR–I. The starters 23 and 24, Figures 4 and 6, engage of course and the engine will gain speed until at about 8,000 R. P. M. for example, the ground idle solenoid 108, Figure 3, will operate to acquire fuel control and free the fuel regulation from answering to exertions of the fuel metering amplifier 74. The engine then attains a speed of say 9,500 R. P. M. and settles to idle, being in flat pitch.

The condition lever may next be advanced to "cruise," the power lever all the while being in "cruise idle." The status of the machine in such circumstances corresponds to the No. 2 contingency of the temperature resistors and to the second situation for the governor operation described as concerns the speed resistors.

With the levers 84 and 86 respectively in "cruise" and "cruise idle," "cruise idle" power will be made available. The speed which will correspond to "cruise idle" power is of the order of 11,000 R. P. M. at cruise temperature. Actual circuit operation is as follows. Generally, the "idle" or "I" switches are restored to normal position and the "cruise" or "C" switches are operated. Lower idle switch I–2, Figure 3, opens the circuit through normally closed switch R1–2 and the actuated switch R6–3 to the ground idle solenoid 108, thus removing the fuel control from cognizance of ground idle metering. Cruise switch C–1, Figure 3, closes and through switch R6–2, held closed by relay R6, energizes relay RC.

Actuation of relay RC will be registered in two places. RC operates first a set of transfer contacts RC–1 connected to the normally closed idle switch I1, thereby forming a holding circuit through normally closed switch RL–1 to relay RC itself. This action locks in relay RC independently of relay R6, still in operation for the time being. Relay RC may also operate in the temperature resistor group, Figures 11 and 13, to afford resistor TR–CL or TR–CL′ active control over the fuel flow. The switches I–4 and S–2 to the lowermost resistor TR–SI of course are open. The temperature normally to be expected of resistors TR–CL and TR–CL′ may be 1960° R. for example. With the power lever in "cruise idle," the switch CI–1 Figures 11 and 13, may be closed and the resistor portion 194 shorted out. With the governor in underspeed condition and relay R10 energized, switch R10–3 may be closed to short out the counterbalancing resistor portion 196. Hence the effective temperature may be maintained at 1960° R. for example. Fuel flow is then increased by amplifier control 74 and the engine gathers speed over the 9500 R. P. M. ground idling value.

In the speed resistor group, Figures 14 and 15, switch C, may close to prepare the circuit for speed resistor SR–C. Resistor SR–C, whose slide wire is positioned by the power lever, may be set at a position corresponding to being just inside the speed setting arc for shaft 262; this speed may be 11,000 R. P. M. or other as desired. The governor, once afforded control over the propeller pitch, will keep the pitch low or at about zero to meet the higher speed called for when the SR–C circuit, as prepared, is completed.

Pressure capsule P2, appearing in Figure 3, may be calibrated to operate at a pressure corresponding to some convenient engine speed, say 10,000 R. P. M. When actuated, this capsule may operate a normally closed switch P2–1. Then with the engine accelerating under influence of the increased fuel flow due to control being shifted to temperature resistor TR–CL, a speed will be attained which may cause P2 to be actuated. With switch P2–1 opened, relay R6 is deenergized, throwing switch R6–5 back to its normal position. The direct result is that speed control is placed in resistor SR–C through closed switch C3. Shaft 262 then rotates out of its pitch setting arc into the speed setting arc and restores the governor control to regulation of propeller pitch.

Deenergizing relay R6 also may cause the switch R6–1 to disconnect the holding circuit of Figure 3. Likewise affected is relay switch R6–2, which originally had made possible actuation of relay RC. Switch R6–3 may be restored to its normal position, breaking the circuit to the ground idle solenoid 108, no longer in use. Switch R6–4 may be opened to allow the low pitch stop to be given effect in the pitch control again.

If the range for governor error is assumed to be 1,000 R. P. M. wide, at about 10,500 R. P. M. the underspeed contacts G–2, Figure 3, may open, deenergizing relay R10 and breaking the circuit of R10–3, Figures 11 and 13, and reducing the temperature in the burners about 100° R. below cruise temperature since the shorting switch CI remains closed. The controlling solenoid at the conductor terminal 208′, Figure 14, for decreasing pitch may also be deenergized when the engine passes the set value of say 11,000 R. P. M. If it arrives at the upper limits of its 500 R. P. M. band (11,500 R. P. M.) the overspeed contact G1, Figure 14, may close. The overspeed pitch solenoid via post 209′ will also have been energized to increase the pitch and cause the propeller to commence to slow down. Moreover, relay R9 and its contacts R9–5 of Figures 7 and 8 are actuated for doubly shorting out the already shorted resistor portion 194, in order to reduce the burners to "cruise idle" temperature.

The low pitch stop, activated at this stage, may thenceforth operate to keep the propeller well above the zero pitch setting. The instant status, where the engine is "cruise idling" at reduced temperature of about 1860° R. and kept within a speed of between 10,750 and 11,250 R. P. M. for example, by the governor, corresponds as stated to the No. 2 contingency for the temperature resistors and to the second situation under which the governor must act. This status may be achieved in a more direct fashion, however, to be discussed below.

Same—direct advance "stop" to "cruise"

With the power lever in the same position of "cruise idle" all the while, the condition lever may be given a direct transition from "stop" to "cruise" without any necessity for lingering in the intervening "idle" position. This uninterrupted travel circumvents the ground idling step altogether and presents the expedient of a rapid start. A review of the preceding operating mode, that is, the interrupted advance to cruise, will reveal that a number of different fuel control systems were in effect. In the first part of the sequence, namely, to the speed of 8,000 R. P. M. the fuel flow was controlled, with reference to Figs. 11 and 13 by resistor TR–SI and set to correspond to a burner temperature of 1960° R. From 8,000 to 9,500 R. P. M. the fuel flow control was vested exclusively in the ground idle solenoid at the reduced rate of about 86 pounds per hour. Then in the range from 9,500 up the fuel flow was controlled by a resistor TR-CL which attempted to maintain a box temperature of 1,960° R. When the cruise idle speed was reached the temperature reduced to 1,860° R. These figures make no claim as being representative but are presented merely for the purposes of affording a proportional check and relative amplitudes as between themselves. On the other hand, in the instant operating mode under discussion, that is, where there is no intermediate step prior to achieving the crusing condition throughout the starting cycle, there are only two fuel flow sequences. Up to the cruise idle speed as in the previous mode, the temperature is maintained at about 1960° R. as by resistor TR-CL due to the fact that the portion 196 is also shorted out. When the cruise idle speed is reached the temperature reduces to 1860° R. The discussion to follow will illustrate the actual mechanics involved in this sequence.

Essentially the initial starting phase will be the same as for the interrupted start. With the power lever 86 in cruise idle, from "stop" the condition lever may be moved straightway to "cruise." With relay switch R6-2 closed, a circuit may be completed through cruise switch C1 so as to actuate relay RC in Figure 3. The switch RC3, Figures 11 and 13, may close to afford resistor TR-CL active control of the fuel line. Inasmuch as about the lowest speed setting for the governor may be 11,000 R. P. M., the underspeed contacts may be closed during the starting cycle to energize underspeed relay R10. Switch R10-3 may be closed to short circuit the resistor portion 196. Since the switch CI is closed so as to short out the temperature reducing portion 194, a counterbalance to portion 196, the fuel may flow at a rate corresponding to about 1960° R. Operation of relay R10 may be of moment in the additional regard that switch R10-1 of Figure 3 may close. The circuit thus made may cause dashpot disabler 106 to operate and disable the fuel metering stabilizer so as to facilitate immediate fuel flow response. This fuel rate may be maintained for some steps to follow in the starting sequence. Also effected by the actuation of relay R6 will be the contacts R6-5 in its stack. Contacts R6-5, seen in Figures 10A and 11, operate to cause actuating motor 260 to rotate so as to correspond to the zero pitch setting and thereby vest propeller pitch control in the speed resistors. In reference to Figures 3 and 5 the closing of cruise switch C2 completes a circuit through the already actuated switch R6-1 such that the relay R4 is energized. The events to follow run much in the same order as noted for the previous mode, with the relay R4 causing the starters to engage and begin active operation. As a speed of approximately 1500 R. P. M. is attained by the rotating machinery acting under the influence of these starters, the preset pressure switch P1 operates, in Figures 3 and 5, the switch P1-1 and also the switch P1-2. Switch P1-2 opens the circuit which is parallel to relays R4 and R1 but since the counterpart portion of the circuit is at this time closed it will have no immediate effect. The switch P1-1 however, serves to energize relay R1, the relay which has control over ignition and prime. Thus through switch R1-1 the prime and ignition units 54 and 45, Figure 3, are actuated while at the same time the switch R1-2 connected down through idle switch I2 opens up so as to disable any circuit which might later be prepared. With the help of the added boost in torque from the turbine, the rotating machinery may begin to gain speed at a more rapid rate. During this interval, as was noted in the discussion of the starter circuit of Figure 6, the relay R13 will be actuated so as to switch the starters of that particular embodiment from series to parallel operation. As the rotative speed increases, at the calibrated value of 8,000 R. P. M. the relay R5 is actuated and almost immediately as a result of its own operation is dropped back out of the circuit. In especial regard to the device of Figures 3 and 4, when the current relay R5 is reduced the switch R5-1 opens and drops out relay R4 by means of switch R5-1. Relay R4 through the medium of its switch R4-1 may drop out the starter relays and disengage the starters. In the particular regard to the embodiment of Figures 5 and 6 when relay R5 is actuated the normally closed switch R5-2 in its stack breaks a circuit to drop out relay R3, which latter in turn releases the starter relays and causes the starters to disengage. Also switch R5-1 of relay R5 drops out the relay R4. When relay R4 opens, it opens with it switch R4-1 which causes the relay R2 in the starter circuit to be opened up at the same time that the relay R3 in the starter circuit is open such that the supply to the starters is interrupted. Without any voltage impressed across its terminals, the relay R5 then itself drops out of circuit. The net effect is that the relay R5 has dropped its own self out of operation in an instantaneous fashion. The fact that relay R5 has been active to drop out relay R1 has special significance in the previous mode discussed. As to Figure 3, it will be recalled that when switch R1-2, shown at the lower portion of the diagram connected in series with idle switch I2, was restored to its normally closed position, the circuit was completed to inaugurate operation of the ground idle solenoid. Now, however, with the idle switch I2 remaining effectually open at all times the switch R1-2 can have no effect in the operation of the engine. With the starters out of active operation the engine, being supplied with fuel at a rate conforming to a box temperature of 1960° R., continues to accelerate from this 8,000 R. P. M. speed and eventually attains the speed for which pressure capsule P2 is set to operate. This speed, which may amount to 10,000 R. P. M. causes pressure capsule P2, Figures 3 and 5, to open switch P2-1 and since relay R6 is being served by this particular switch the relay R6 may be caused to drop out. Such behavior is of particular significance when considered in connection with the peculiar construction and arrangement of P2 and R6. Relay R6, initially energized only in the "stop" condition, may serve to prepare certain starter circuits which for the most part might otherwise remain open. By virtue of the commanding position of its switch R6-1, the maintenance of relay R6 in operation is a prime requisite for continued operation of the starters and ignition circuit: that is, after relay R6 has dropped out, it is impossible to re-engage the starters until the engine has slowed down below the set point of P2.

Now let it be supposed that relay R4, Figures 3 and 5, be actuated by a straight-timed mechanism. In a cold climate where lubricants tend to remain thickened until warmed, the machinery such as contemplated here may be extremely slow in coming up to speed. A straight timed mechanism would then disconnect the starters too previously and deny the engine the benefit of the added torque otherwise available; also the ignition would cease. Indeed, if the starters were disengaged before the fires were burning properly, the flame might no doubt find itself extinguished or smothered and the engine would die. This same result might follow in a cool climate at a high altitude or under conditions of extremely rarified atmosphere.

However, in a fully compensated timed start as relay R5 aids in affording, the starters and ignition may not be dropped out of operation by relays R1 and R4 prior to their being assured a substantial speed, air flow, and consequently, flame pattern in the engine. Now during this uninterrupted mode the switch R6-3, connected to the ground idle solenoid in Figure 3, will tend to shift from its downward to its upward position but since the circuit I2 is open there will be no such effect as was seen in the interrupted mode. In the speed resistor portion, Figures 10A and 11, switch R6-5 will be restored to its normal position whereby, inasmuch as the switch C3 is already closed, the speed setting may be vested in the upper resistor SR-C which may be set in the speed setting range to an amount of about 11,000 R. P. M. Rotation of shaft 262, Figure 14, restores the governor control posts 208' and 209' to connection with pitch control 12 such that they directly control the propeller pitch. Since the engine is at this particular instant rotating at about 10,000 R. P. M. the switches 201 and 205 of the governor may come into effect in underspeed status to retain the propeller pitch in its flat setting more or less.

Elsewhere in the governor, underspeed contacts G2 will have been closed to energize relay R10. Contacts R10-3, Figures 11 and 13, will be caused to close whereupon portion 196 of resistor TR-CL or TR-CL' will be shorted out with the effect of counteracting the temperature depressing function of shorted-out resistor portion 194. The latter resistor portion would have already been shorted out due to the fact that switch CI-1 is adapted to operate when the power lever is moved into "cruise idle." Likewise affected with the energization of relay R10, switch R10-1 of Figure 3 closes to disable the fuel metering stabilizer through the medium of dashpot disabler 106, and thereby facilitates immediate fuel flow response. The fuel needle will therefore be positioned to provide a fuel flow sufficient to produce a temperature in the nozzle box of 1960° R. The machine may continue then to accelerate in the fashion as disclosed for the prior mode and may be stabilized at the speed of about 11,000 R. P. M. by the governor. When the governor is in the overspeed and intermediate position, a reduced temperature may be maintained in the nozzle box. This temperature may be designated cruise idle temperature. Yet if the engine attains a speed of 500 R. P. M. under 11,000 R. P. M., the underspeed governor contacts may take effect to increase the box temperature to 1960° R.

Taxiing—"cruise" condition

The operation thus far discussed has been addressed to bringing the machine to a "cruise" condition with the power lever all the while in "cruise idle." In these circumstances where the temperature control is vested in resistor TR–CL or TR–CL', Figures 11 and 13, where the speed control is vested in the power lever, and where governor makes the pitch conform to the speed, the power lever controls the rate at which the hot gases flow through the machine and controls the power output. The power lever may be advanced to any position along resistor SR–C, Figures 14 and 15, and the thrust will increase accordingly. If the speed is advanced to say 15,000 R. P. M. the machine perhaps can be taxied at a convenient rate. At any time progress on the ground is too slow the speed may be increased, and vice versa if the progress is too fast. Whenever there is a change it will be reflected by a change of setting in the governor whereupon the switches 201 and 205 cause the propeller pitch to vary commensurately.

In the particulars of Figure 3, the dashpot, not shown, of the fuel metering system may be provided to stabilize the rate of change of fuel flow and keep too drastic a change from being suddenly instituted. The dashpot disabler, 106, may serve to disable the dashpot unit at such times as stability is not particularly desirable. The device 106 may be seen served by switches R9–1 and R10–1 to the effect that whenever underspeed or overspeed contact is made, the dashpot may be disabled. When the governor calls for more speed, then, not only may be the propeller pitch, Figure 14, decreased (switches 201 and 205 and 208', 209'), but also may be the burner temperature, Figures 11 and 13, increased (R10–3) and the time of response, Figure 3, speeded up (R9–1 and R10–1). The governor may be said then to be arranged to gear the propeller load and speed to meet the power setting called for at a fast pace.

Take-off—"cruise" condition

After the aircraft has been taxied to the end of the runway, full power for takeoff may be obtained by advancing the power lever even farther. Toward the limit of its travel, the slider 252, Figures 14 and 15, on the power lever advances the governor setting to what may correspond to maximum turbine speed. This figure may be of the order of 17,000 R. P. M.

In the temperature resistor group of Figure 13, the right-hand portion of resistor 195 will be tapped by the slider 192 so as to raise the burner temperature somewhat above 1960° R. When the power lever 86 is moved to the "military" position, switch HS–3, Figures 11 and 13, may close to provide the resistor TR–CL and TR–CL' with the maximum temperature characteristics, namely 2060° R. at maximum speed.

Acting at full power, the machine may complete the take off and climb. Upon assuming level flight, the operator may reduce the power lever setting to a desirable thrust. These changes, as noted, are assisted by relays R9 and R10 which change the burner temperatures at the same time the governor controls 201 and 205 are varying the propeller pitch. Assistance notwithstanding, the speed changes may require as much as fifteen seconds for completion. However, excellent fuel economy may be the reward for this cruising condition of operation and it may outweigh the relative delay in awaiting power changes to go into effect.

"Land" condition—rapid power changes

The preceding section related to taxiing, take off, and cruising—operations not requiring too instantaneous a response in the matter of change of power output. To take care of those flight conditions warranting rapid transitions in thrust delivered, a "land" position may be provided for the condition lever 84. Among the situations requiring quick power changes would be during landing and combat.

In the "land" condition, fuel economy that is otherwise possible must needs be sacrificed. The turbine may be governed at approximately maximum speed, say 17,000 R. P. M. by the governor which may be set at maximum setting and in control of the propeller pitch. The power lever may vary the power by varying the temperature setting. Since at high speeds the turbine is an inherently stable machine, no stabilizing portion will be necessary for the fuel system.

Let it be assumed that the machine is operating in "cruise" condition, that is, with the condition lever in the "cruise" position. Let it further be assumed that the power lever is in the power control area calling for an equivalent speed of 16,000 R. P. M. more or less. Now let it be supposed that the condition lever be advanced to "land." The most expeditious manner of obtaining the maximum speed of say 17,000 R. P. M. as called for apparently would be to advance the burner temperature, an action described in the detailed circuit operation to follow.

The effect on the speed resistors, Figures 14 and 15, may be that cruise switch C–3 opens and land switch L–3 closes to place speed resistor SR–L in circuit. This resistor SR–L calls for maximum speed setting of the governor whereupon shaft 262 rotates into the region of 17,000 R. P. M. Governor 203 will react in the fashion that underspeed contacts G2 close and occasion the operation of relay R10. Switches 201 and 205 assume positions of underspeed and act by suitable rheostats, not shown, upon terminals 208' and the appropriate decreasing pitch solenoid of pitch control 12. The propeller blade angle may forthwith be expected to flatten.

As especially applies to Figure 15, in place of a speed resistor such as SR–L calling for an exact and constant speed setting of say 17,000 R. P. M. a variable resistor SR–L' may be provided and arranged to move with the power lever. The fact exists that since the power lever may be in an intermediate position of power control, the speed may then be slightly varied to advantage in accordance with the power lever position. Thus the power lever may be afforded a minor latitude in speed setting under "land" conditions, with the maximum R. P. M. being of a value around 17,000.

As regards the circuit of Figure 3, one of the land switches to close may be L–1, in circuit with dashpot disabler 106. Fuel system response no longer needing to be slowed since the machine is stable at high speeds, the disabler 106 may be operated continuously either with or without the aid of relay switches R9–1 and R10–1. The cruise switches C–1 and C–2, etc., may be all returned to their normal positions. Yet relay RC may not immediately drop out of the circuit since it may be held in by its holding circuit RC–1 through normally closed switch R6–1.

With underspeed relay R10 of Figure 3 operating, the closure of switch L–2 may make the circuit to relay R8 which may therefore operate to connect itself through switch R8–2 into the circuit independently of the contacts on R10. This relay R8 takes into account the fact that it takes a finite time for the engine to speed up to loading R. P. M. Actuation of relay RL may preferably be delayed until actual "land" conditions exist in machinery operation. Since switch R10–2 will be temporarily caught in its normally closed upward position when "land" switch L–2 closes, relay R8 is of moment in that its normally open switch R8–1 will be open and relay RL is open circuited. In the next instant after L–2 is closed, switch R10–2 may be thrown downwardly, energizing relay R8. Then the switch R8–1 may prepare a circuit through a normally closed contact R10–2 which at the present time may be in its other, or downwardwise position. As the power plant approaches the high or military speed, the switch in the governor may return to neutral, thus dropping out relay R10. The normally upward switch R10–2 may then operate relay RL. In circuit with relay RC, switch RL–1 opens to drop out the relay RC, while in circuit with relay RL, the switch RL–2 may close to effect a holding circuit for relay RL. Such action inaugurates a chain of events in other portions of the control system.

The temperature resistor circuits, Figures 11 and 13, may be affected whereby switch RC–3 opens and RL–4 closes. Forthwith, temperature control may be transferred from the upper resistor TR–CL or TR–CL' to the intermediate resistor TR–L. Movable arm 182 on TR–L being attached to the power lever, the temperature maintained in the burners and, consequently the fuel flow, may then be set directly by the power lever.

It may be seen from the foregoing that the ultimate situation achieved in going to "land" condition and the method of attainment largely may depend on the power lever setting. As the machine is coming up to speed before resistor TR–CL or TR–CL' is disconnected, underspeed relay switch R10–3 may be closed. If the power lever happens to be in "cruise idle," a removed possibility at most, the transition to "land" may be made with switch CI–1 closed, an eventuality counteracting the making of the R10–3 circuit and keeping the temperature normal, that is, 1960° R. or thereabouts. If the power lever happens to be just above "cruise idle," an unlikely possibility, the slider 192 of Figure 13 may occasion a transition in temperature well below 1960° R.: in the intermediate position along portion 191 the temperature may be slightly below that of resistor TR–CL in Figure 11, namely about 2,000° R., since relay switch R10–3 may then independently call for a temperature increase in the burners of 100° R. above the normal value for TR–CL'. If slider 192 happens to be along resistor portion 195 of resistor TR–CL' due to the power lever being in an advanced power control position, the temperature may be as much as 2060° R.

As soon as the military speed is achieved, the burner temperature then may be directly under the control of resistor TR–L in both Figures 11 and 13, and set directly by the power lever. Nevertheless, the same end speed may not be reached in the embodiment of Figure 14 as in that of Figure 15, depending on the position of the power lever. In the latter figure, a positioning of the power lever in "cruise idle" or in the boundary area to it will cause a speed signal to be sent out which corresponds to slightly below the 17,000 R. P. M., or thereabout, mark. Slider 248 may thus be in the lower speed area corresponding to portion 247 of resistor SR–L'.

For the power lever settings noted in the sections immediately preceding a rapid transition to "land" condition was made possible with the governor contacts to relay R10 affording an advancement of burner temperature. So soon as the underspeed situation was relieved—i. e., by higher temperature and by the governor flattening the propeller pitch—relays RC and RL changed positions to shift temperature resistor control. By reference to land switch L–2 in Figure 3, it may be seen that if "land" condition should be set with the power lever in "military" position, the switch HS–2 will institute an immediate transfer of temperature resistors as follows. Relay RL will be energized despite any underspeed condition of the governor. Switch RL–1 may drop out relay RC, and through normally closed switch RC–1 the switch RL–2 closes the holding circuit to relay RL. Then the maximum temperature may be set and maintained independently of underspeed relay R10.

When the governor 203, Figure 14, reaches the neutral and then overspeed position in attaining "land" condition, relay R10 may be deenergized and then subsequently relay R9 may be energized. In regard to Figure 14, when neutral position is assumed by switches 201 and 205, the propeller ceases flattening; then when overspeed position is assumed by switches 201 and 205, the propeller begins to increase pitch. The "land" condition continues then to be maintained with relays RL and R8 in active position with the governor switches 201 and 205 setting the propeller pitch in order to maintain maximum or near maximum speed, and with the power lever setting the fuel flow and burner temperature. An aspect not to be lost sight of, as regards the burner temperature, perhaps is the temperature compensator 36 of Figures 11 and 13. As the temperature of the air entering the burners increases slightly, the electromotive force of 36 opposing the signal from active resistor TR–L tends to modify the signal. Hence the end burner temperature rise may have automatic compensation for changes of temperature in air supply.

Thus the transition from "cruise" to "land" has been traced for a number of readily conceivable situations. So far as the more likely of the situations is concerned, the transition was made generally under two successive temperature statuses. In the initial or underspeed status the burners were maintained at 2060° R. more or less due to relay R10 and its switch R10–3, Figures 11 and 13. After the speed change was accomplished and pitch decrease was halted, the temperature was then observed to be retarded to the value called for by the power lever along resistor TR–L, Figures 11 and 13.

Land condition may also be set directly from ground idle. In respect to Figures 14 and 15, in the ground idle status the switch I–5 may be found closed such that resistor SR–I is active as far as keeping the speed setting from floating is concerned, irrespective of relay R6 and its attendant switch R6–5 and relay R12 and its attendant switch R12–5. A circuit from the zero pitch point 233 on resistor SR–I may be completed then either through switch R12–5, I5, and B3 or else directly through switch R6–5 if the latter happens to be in leftwardwise position. As soon as the land switch L3 closes in an attempt to transfer control to resistor SR–L or SR–L', if relay R6 happens to be unenergized, the speed control will be vested immediately in resistor SR–L or SR–L' by virtue of switch R6–5 being to the rightward. Contrariwise, if relay R6 happens to be energized, switch R6–5 may be in the leftward position and a zero pitch will be called for from the accelerating period of 9,500 R. P. M. to 10,000 R. P. M. Above this point relay switch R6–5 will be thrown to the right and speed control will be vested in resistors SR–L or SR–L' of Figures 14 and 15. With the governor set for a speed of 17,000 R. P. M. due to the "land" condition then prevailing, the shaft 262 may be rotated into its speed setting arc regardless of whether it happens to correspond to 9,500 or 10,000 R. P. M. and the underspeed switch G2 may close and switches 201 and 205 will go into underspeed status. As soon as shaft 262 is in its speed setting arc the governor is afforded direct control over the propeller pitch. Thus post 208' may be energized by the rheostats immediately adjacent to and under influence of the switches 201 and 205, to keep the pitch setting reduced. Let attention be turned to Fig. 3. The closing of land switch L1 insures dashpot disabler 106 and the removal of the fuel flow from stabilization. It will be recalled that the machine is inherently stable at military speed anyway. Land switch L2 may also close. If the power lever happens to be in its military position, the switch HS–2 will be found closed. On the other hand, if relay R12–3 had happened to be in operation, the switch R12–3 would momentarily be closed. The end result is that relay RL may be energized forthwith and through the circuit from closed switch I1 would tend to keep relay RC from operating. If, however, switch HS–2 and R12–3 happened neither to be closed when underspeed relay R10 was actuated and switch R10–3 was closed to its downward position, only then would relay R8 be actuated such that R8–1 would close to prepare the circuit to relay RL. As the engine approached military speed, relay R10 might be expected to be deenergized and switch R10–2 thrown upwardly. Thus relay RL may operate to keep out of circuit relay RC. As to Figures 11 and 13, operation of relay RL may cause relay switch RL–4 to close. A circuit may result such that temperature control is vested in resistor TR–L or TR–L'. The power lever then may have direct control over the fuel flow and over the temperature maintained in the burners. There may exist the contingency that relay RL would be delayed in its operation until the military speed was attained. Such a condition was noted in case two switches HS–2 and R12–3 were open. Therefore with relay switch RL–4 being delayed, the opening of idle switch I4 when the condition lever was moved to "land" would tend to leave the fuel metering needle in the same position as would occur when switch I4 was effective. Switch I4 then serves to keep the temperature control from floating. Upon attainment of military sped such that relay RL may operate when the underspeed condition is relieved, the switch RL–4 may close and the resistor TR–L or TR–L' may take charge of setting the engine temperature.

*Reversion from "land" to "cruise" condition*

Let it be assumed that from the "land" condition with the power lever in an intermediate setting in its power control area, the "cruise" condition is set. In regard to Figures 14 and 15, the land switch L3 will open and cruise switch C3 will close to make resistor SR–C the active speed resistor in the circuit. A voltage signal will be relayed to speed setting shaft 262 which after a momentary pause will move into a lower speed-range setting. Since a lower speed is called for than the usual 17,000 R. P. M. land speed, the switches 201 and 205 will assume overspeed status to the end that the overspeed post 209′ will be energized and the propeller pitch will gradually undergo an increase. Relay R9 at the same time will be instantaneously energized by overspeed contact G1. As regards Figure 3, motion of the condition lever to "cruise" entails closure of switch C1 which by virtue of the fact that switch R9–2 had been previously thrown to its upward position will energize the relay R7. Since there it takes a finite time for the engine to slow down as was heretofore noted, it is the sole purpose of relay R7 to prevent a too-previous energizing of relay RC. Moreover, this permits the engine to slow down at the reduced temperature prevailing during the loading condition. The behavior may be seen to be much the same as was noted for relay R8 as related to delaying relay RL. If relay RC may be designed to function only when the machine has been reduced to "cruise" condition and without the interposition of relay R7 and its switch R7–2, the contacts R9–2 would cause relay RC to operate a trifle prematurely. When actuated, by means of its holding circuit through R7–1, relay R7 is able to remain in operation regardless afterwards of the position of switch R9–2. Also actuated is switch R7–2 which closes to prepare the circuit to relay RC. With governor 16 of Figure 14 in overspeed, the engine slows down at the same temperature, cold though it may be, as set by temperature resistor TR–L, Figures 11 and 13, the slide wire 182 of which assumes a position corresponding to that of the power lever during "land" condition such that the governor eventually assumes a neutral status. At that point contact G1, Figure 3, opens to drop out relay R9. To center further attention on Figure 3, the actuation of relay R9 causes switch R9–1 to open the circuit to dashpot disabler 106. Since the machine is no longer to remain in "land" condition, the dashpot disabler is no longer active and the fuel system resumes its normal fuel stability. Connected through closed switch C1, the switch R9–2 resumes its normally downward position and completes the prepared circuit through switch R7–2 to the relay RC. The significance of any operation of relay RC is, as disclosed above, that the engine has achieved "cruise" condition. RC–1 accordingly moves to its upward position and opens the circuit to relay RL and at the same time closes the circuit leading from normally closed switch I1 through the now closed switch RL–1 to relay RC itself to provide a holding circuit for the latter. Thus the action of relay R9 inaugurates a chain of events resulting in the removal of relay RL from the circuit and the placing of relay RC in circuit. As applies to Figures 11 and 13, when the relay RL–4 opens and relay switch RC–3 closes, the result is that temperature control is vested in resistor TR–CL and TR–CL′ in the place of the "landing" resistor TR–L. Inasmuch as the switch R9–5 opens at the same time that relay R9 is dropped out of the circuit, a higher temperature is allowed to be maintained by the resistor TR–CL and TR–CL′ than was allowed by resistor TR–L. The reason for this situation is simply that under the conditions assumed the power lever was in a somewhat retarded position such that the position of slide wire 182 relative to resistor TR–L happened to be adjacent a relatively lower temperature portion. Just as soon as relay R9 is dropped out of circuit and switch R9–5 opened, the change of relays RL and RC respectively from operative condition causes a change in connections such that the upper resistors TR–CL and TR–CL′ are afforded direct temperature control. As respects Figure 14, when the overspeed contacts of governor 16 act to open, the switches 201 and 205 assume a neutral status whereby the post 209′ to the propeller pitch control solenoid ceases to be energized and the pitch angle of the propeller ceases increasing. Upon attaining "cruise" condition, the propeller in due course may tend to slow down further with the result that switches 201 and 205 will undergo an underspeed status and the post 208′ connected to the underspeed solenoid in the propeller pitch control will cause the propeller pitch to decrease somewhat and thereby allow the propeller and engine speed to increase. The end result will be that the propeller will be more or less stabilized at the speed desired. As regards Figures 11 and 13, since the power lever was supposedly at the outset in a lower position on its operating range of power control, as soon as' relay R10 operates, the switch R10–3 will close to increase the burner temperature by 100° R. more or less. The burner temperature would then have limits between a reduced temperature of 1860° R. when the overspeed relay was actuated to a condition of increased temperature of the value 2060° R. when the underspeed relay was energized and switch R10–3 closed. As to Figure 3, when the relay R10, the underspeed relay, is actuated, switch R10–1 closes to operate diabler 106 and disable the stabilizing mechanism of the fuel system.

As the premise conditions were stated, power lever 86 was disposed in a lower control setting at the time the condition was retarded from "land" to "cruise." Let it now be supposed that the power lever had been in the "military" position. As respects Figures 14 and 15, transfer of active control from resistors SR–L and SR–L′ to cruise resistor SR–C would not change the effective voltage signal in the actuating circuit at all. The speed responsive element 203 of governor 16 would be maintained along with its switches in the neutral position.

With reference to Figure 3, the switch HS–1 would be closed since the power lever occupies the "military" position. The contacts of switch C–1 would make the circuit to relay RC. Switch RC–1 would be thrown to drop out RL, whereupon normally closed switch RL–1 would be restored to complete the holding circuit to relay RC.

In the nets of Figures 11 and 13, switches RC–3 would close and RL–4 would open. Switch HS–3 being closed, temperature in the burners may stay elevated to about 2060° R. and resistor TR–CL and TR–CL′ may be in active control of temperature settings.

The machine may thus be changed over from "land" to "cruise" condition with no appreciable effects visible as to the outward operating conditions.

*Transition down to "ground idle"*

The "ground idle" condition may be set from either "land" or "cruise" as desired. As to Figure 3, when the ground idle condition is set it is to be noted that no switch along the left fringe of the net remains closed with the exception of switch I–2. This switch makes the circuit through normally closed switch R6–3 and ground idle solenoid 108 to reduce the fuel flow immediately to a minimum. Switch I1, normally closed, will open in the idle condition to drop out relay RC or RL which ever relay happens to be in operation. Active operation of relay RC, it will be remembered, represents the end condition reached when the controls are set at "cruise" and RL correspondingly represents the end condition when the controls are set at "land." However, the idle condition as noted causes both of these relays to drop out. By way of illustration, if relay RL had been energized through its switch RL–2 of the holding circuit and normally closed switch RC–1, then the disconnection of the circuit resulting from opening switch I1 would cause the relay RL to drop out. On the other hand, if relay RC happened to be in the circuit such that normally closed switch RL–1 and switch RC–1 completed the connection through switch I1, then so soon as switch I1 was opened the relay RC would drop out. As regards Figures 8 and 9, idle switch I4 would close when the condition lever was retarded to "idle" and would tend to transfer the temperature control so as to render resistor TR–SI active. The upper two temperature resistors would have been de-activated by switches RC–3 and RL–3 due to the opening of the aforesaid circuits. The temperature control then will not be allowed to "float" while ground idle solenoid is in actual control of fuel flow to the burners. As regards Figures 14 and 15, since switches C3 and L3 are open, the idle switch I5 may close in order to connect to activity the resistor SR–1. This resistor forthwith will call for a reduced speed of 11,000 R. P. M. regardless of whether the engine was operating in "cruise" or "land" condition and a momentarily delayed response will be noted for speed setting shaft 262. Eventually, however, the governor 16 will have a new setting calling for a reduced speed. The overspeed post 209′ will be caused to be energized in course by switches 201 and 205 and the propeller pitch will be increased. Moreover, overspeed contact G1 will be closed to energize relay R9. As to Figure 3, the closure of idle switch I2 linked with the event that relay switch R9–3 is closed will actuate relay R11. The momentary lag of the speed setting shaft, as was noted before, occasions a situation whereby before the relay R9 could operate upon closure of switch I2, the relay R12 would be actuated. Relay R12, however, has the faculty for reflecting by its own activity the end condition reached when the power plant is retarded to ground idle condition. It is, therefore, desirable that a relay R11 be interposed to compensate for the delay of the speed setting shaft and prevent any lag in response to relay R9 from causing relay R12 to operate prematurely. Hence as soon as switch R9–3 closes, through idle switch I2 the relay R11 is energized which action may prepare the circuit to relay R12 through contacts R11–2. The relay R11 also has a self-holding switch R11–1 which actively holds it in circuit despite the temporary status of switch R9–3. Acting under the combined conditions of ground idle fuel flow and increased pitch setting, the engine may slow down rather drastically to a point where the overspeed contact R9 opens. Switch R9–3 therefore opens and the switch R9–4 resumes its normally closed position. Hence a circuit is completed to relay R12 through the already closed switch R11–2. Operation of relay R12 closes switch R12–1 to complete the holding circuit making the operation of relay R12 independent of switch R11–2. The engine at this time is operating at about 11,000 R. P. M. more or less. The switch R12–4 may then with safety close to remove the low pitch stop disabler 110 in propeller pitch control 12. As applies to Figures 14 and 15, as soon as relay R12 operates (at the speed of about 11,000 R. P. M.) the switch R12–5 may be thrown leftward to call for zero propeller pitch setting as made possible by the now closed position of idle switch I5. Operating under reduced fuel flow, even though at flat pitch, the propeller will slow down to a speed of about 10,000 R. P. M. At that point the pressure switch H2 of Figure 3 operates to restore the normally closed position to its switch P2–1. Hence a circuit is prepared for relay R6 through its normally open holding switch R6–1.

*Direct resumption "land" from "ground idle"*

Logically the move to "ground idle" condition is preparatory to setting the "stop" condition, a normal sequence set forth in the section following. Yet if from "idle" the condition lever is suddenly advanced to "land," the circuits for automatic operation have been designed and compensated to respond in a suitable manner.

In respect to Figures 14 and 15, switch I5 may open and switch L3 may close: speed control may be transferred from speed resistor SR–I to resistor SR–L or SR–L′ whereupon speed setting shaft 262 after a slight hesitation will set the governor switches 201, 205 and 206 in a condition of exaggerated underspeed. Post 208′ to the pitch control 12 will act to retain the propeller in flat pitch and underspeed relay R10 may be operated.

In Figure 3, "land" switch L2 may close as soon as "land" condition is set. Since relay R12 has locked itself into circuit through switch R12–1, the switch R12–3 immediately may energize relay RL. It may be well to inject the observation here that the net effect is the same as if the "land" condition had been achieved from "cruise" with the power lever in "military": in "cruise," normally closed relay switch RC–2 would necessarily have been opened to drop out relay R12 and its holding circuit through switch R12–1; switch HS–2 would have completed a circuit made by land switch L2 to energize relay RL. Nonetheless, relay RL assumes operation to the exclusion of its counterpart relays immediately. Switch L1 forthwith may remove the fuel stabilizing mechanism 106.

After the customary lag for speed setting response, switch R10–2 may close to energize relay R8 and close its holding circuit through switch R8–2. Switch R8–1 may prepare the circuit to relay RL such that when the underspeed condition has been relieved, the switch R10–2, normally up, may be restored upward to hold relay RL in circuit despite the position of switch HS–2 or R12–3. Relay RL is also held in by its contact RL–2 in series with RC–1 and I–1.

*Ground idle to "stop"*

Motion of the condition lever from "idle" to "stop" causes the switch S1 of Figure 3 to close and to cause energization of relay R6. This relay, by means of the holding circuit R6–1, just described, then holds itself in circuit. None of the relays other than R12 and R6 remain in operation. For example, the idle switch I1, when the condition lever was moved to "idle" would have already caused relays RC and RL to drop out of circuit; since switch L2 had been opened during the sequence, relay R8 would have been dropped out of circuit. Since switch I2 would have been opened when the condition switch lever was moved to "stop," relay R11 would have consequently been dropped out. Motion of the condition lever 84 to "stop" not only causes the bulk of the relays, other than R6 and R12, to be dropped out but through a mechanical connection to the stop valve 56 shown in Figure 1, this motion causes the stop valve 56 to cut off the fuel to the engine.

With relays R6 and R12 both energized in the "stop" condition, in Figures 14 and 15 the switch R6–5 would tend to call for zero pitch; the position of switch R12–5 would have no effect on the situation, since in the normal sequence of operation the switch R6–5 moves to its position to the right only when the "idle" condition is not set and hence switch 15 is open. When either "land" or "cruise" is subsequently attained, the switch R12–5 is restored to its normally closed position to the right since the holding circuit of Figure 3, through switch R12–1 to relay R12, necessarily is open when the relays RC and RL and their respective switches RC–2 and RL–2 are actuated.

Yet relay R12 may otherwise be dropped out in "stop" condition by opening the master switch temporarily; the holding circuit through switch R12–1 may thus be opened, Figure 3, and the reclosing of the master switch will actuate only relay R6. Whatever, though, is the pitch setting of the propeller when ground idle condition is called for, either relay switch R6–4 or R12–4 or both, will oblige removal of the low pitch stop in control 12 by means of the disabler 110.

*"B region"*

In the discussion immediately preceding, the power lever had been confined to its governing range arc. According to the dual role imposed on the power lever by the present invention this lever is afforded an entirely different means of operating control when moved into the "B region." The control nets will generally be rearranged the same regardless of whether the condition lever is happened to be in the "cruise" or "land" positions. The ultimate result corresponds to the first situation noted for the governor and to contingency #1 for the temperature resistors.

Appearing in Figure 3, the switch B–1 may be thrown downward when the power lever enters the "B region." One consequence of such action may be that relays R9, R10, and R12 are open circuited, while the disabler 110 for the low pitch stop of propeller control 12 may be maintained actuated independently of switches R6–4 and R12–4. With relay R12 being in an open circuit relay R11 may be rendered helpless to vary the controls. Moreover, relays RC and RL may be likewise rendered helpless as will be later disclosed and accordingly relays R7 and R8 may be relieved of any force and effect. So long as the "idle" condition is set, the switch 12 may through switch R6–3 keep the ground idle solenoid 108 active; when however the condition lever is advanced to "land" or "cruise" contacts I2 may open and drop out the ground idle operation.

In Figures 11 and 13, switch B2 may move upward to confer temperature control upon resistor TR–CL or TR–CL′, an action independent of the "idle" and "land" switches and of the switches of relays RC and RL. Owing to the fact that the power lever is out of the power region, switches CI–1, R9–5, HS–3, and R10–3 may be open. The temperature signalled to be maintained in the burners may then be of the order of 1960° R, or slightly less with the fuel flow regulated accordingly. If the machine happened to be in the "idle" condition at the time the "B region" was entered, as soon as "cruise" or "land" was set and the ground idle solenoid accordingly removed, fuel flow might have increased forthwith and the engine begun to accelerate. Inasmuch as operation of relay R6 may not normally be extant above speeds of 10,000 R. P. M., all switches in its stack may be restored to their normal positions.

Thus in Figures 14 and 15, switch R6–5 may be in its position to the right and switch B3 be upward. To resistor SR–C may be bestowed active speed control, irrespective of whether "land" or "cruise" happens to be set. The speed setting shaft 262 may then rotate into its pitch setting arc, the respective position conforming to the setting of slider 252, which corresponds to the angular setting of the power lever.

It will be recalled that the governor 16 may be arranged such that when the shaft 262 enters its pitch setting arc, pitch control may be vested directly in shaft 262 through suitable pitch control valves not shown. The speed setting of the governor at this time may automatically be fixed at the constant value of around 15,000 R. P. M. by some suitable means such as a cam switch and appropriate relays; when B region switches B4 and B5 close downwardly, the governor contacts such as from switch arms 201 and 205 may be placed in control over fuel governor by pass 64.

Besides adapting the speed responsive element 203 of governor 16 to a dual role whereby while at the time it normally would remain inactive it may be maintained active in another line of endeavor, the arrangement just described provides for a two-way regulation of fuel flow. Fuel consumed by the engine may be limited thus by the shaft speed or by the temperature setting called for, whichever variable approached its set limit first.

To illustrate, let it be assumed that the engine is operating in "cruise" at the rate of about 16,000 R. P. M., the power lever being set somewhere in the power control sector. As respects Figures 11 and 13, temperature control may reside in resistor TR–CL or TR–CL'. Upon movement of the power lever into the "B region," say at a point corresponding to one degree of pitch setting, switch B2 may close. Obviously resistor TR–CL or TR–CL' may call for about the same temperature setting as before; indeed if at this moment an overspeed condition happened to exist such that switch R10–3 had been closed, disabling of relays R9 and R10 by switch B1 (Fig. 3) might cause resistor TR–CL or TR–CL' to call for even a higher temperature. Hence the change of rate of fuel flow might if anything be in the direction of increase. On the other hand, in Figure 14 the speed setting shaft 262 may swing into its pitch setting arc thereby fixing the governor setting at about 15,000 R. P. M. The governor would then be disposed in an overspeed status and would immediately operate on by-pass solenoid 274 to start reducing fuel flow to the engine. Thus the speed governor 16 for the engine shaft may serve as actuator to reduce fuel flow and engine speed despite any tendency of the temperature resistors to permit higher fuel flow.

In another regard, let the discussion proceed on the supposition that a "B region" setting be made from an "idle" status. Such status is achievable either with relay R12 operating or with relay R6 operating or with both the named relays operating. In the first eventuality noted, that is, with only relay R12 operating, the power lever may be moved to the "B region" to a position calling say for 1° propeller setting. Switch B1 of Figure 3 may move downwardly to open circuit relays R9, R10, and R12 and to remove the low pitch stop of propeller pitch control 12 independent of the closed switch R12–4. When the condition lever is advanced as far as "cruise," the switch I2 may open the circuit to relay R11. Switch R11–2 at this time will be open thus insuring by the opening of switch I2 that ground idle solenoid 108 will experience an open circuit. Thus ground idle control 108 will not be supplied directly through switch R1–2 from switch I2 since the latter named switch is open. Moreover, a sneak circuit cannot be completed through switches R12–1, RC–2, RL–3, R11–2, R9–4, and through R1–2 and R6–3 because switch R11–2 is open. When the condition lever is moved to "cruise" the switch C1 will close without result since switch R12–2 is open. In Figures 11 and 13, "B region" switch B2 may move upwardly to activate the temperature resistors TR–CL and TR–CL'. The switches CI–1, R9–5, HS–3, and R10–3 are all open by virtue of the premises assumed at the outset. With resistors TR–CL and TR–CL' controlling the position of the fuel metering needle the fuel flow will cause the engine to commence accelerating. In Figures 14 and 15, with switch B3 being disposed upwardly the switch R6–5 will be in its normally closed position to the right and speed resistor SR–C will be given control of the speed circuits. Speed setting shaft 262 will be moved into its pitch setting arc and if say 1° pitch was called for by the power lever, this pitch would be tended to be set immediately. As regards the second and third eventualities where relay R6 happens to be operating respectively either with or without relay R12, the switch R6–5 will be found to the left setting and calling for zero pitch at the 9,500 R. P. M. ground idle speed. Upon an increase of 500 R. P. M. due to the fuel flow just noted, the relay R6 will be dropped out of circuit since the circuits are prearranged to perform thus at 10,000 R. P. M. When relay R6 drops out, switch R6–5 will be restored to the right such that the 1° pitch or whatever setting is particularly called for may be set. The net result is that above 10,000 R. P. M. regardless of the previous disposition of relay R6, the pitch control is shifted from resistor SR–I to resistor SH–C. Switches B4 and B5 will be moved to their downward position. Since governor 16 has been placed in a setting for 15,000 R. P. M. due to the fact that the B region being entered by the power lever, the governor is in an underspeed condition and it tends to reduce the amount of the bypass of fuel governor 64. While the engine is undergoing the acceleration burner temperature of 1960° R. may be attained before the ultimate speed of 15,000 R. P. M. is reached and the fuel flow may thus be limited by the temperature resistors before the fuel governor can operate.

It will be apparent, therefore, that an operating and starting control for gas turbines has been provided which is simple and reliable, and which effectively performs the functions of energizing the starting circuit and stopping the motor as soon as the gas turbine has started or has accelerated to a predetermined speed, and of de-energizing the ignition circuit and all other parts of the system automatically at the end of a predetermined stage in the progress of the starting cycle.

It will further be apparent that as particular embodiments of the invention have been shown and described for the purpose of illustration, but it will be understood that various changes and modifications may be made within the scope of the invention such that it can be adapted to suit special conditions met with in practice. Thus the system shown and described is especially adapted for aircraft use and may, therefore, be conceived of as utilizing a battery and a ground return circuit but it will be apparent that any other source of energy might be used and that a wire return circuit might be utilized. It is to be understood, therefore, that the invention is not restricted to the particular details shown and described but in its broadest aspects it includes all equivalent modifications and embodiments which reasonably come within in the scope thereof.

What is claimed is:

1. In combination with a fuel-supplied prime mover effective to drive a load, said prime mover having first operating means incorporated thereon for varying the flow of fuel supplied to the prime mover, and having second operating means incorporated thereon for varying the load on the prime mover, governor means responsive to speed of the prime mover for controlling the operation of said first and second means, and control circuit means between said governor means and said operating means and including switching elements for connecting the governor means to either of said first and second operating means for mutually exclusively controlling the operation of the same to vary the fuel flow and load on the prime mover.

2. In combination with a controllable pitch propeller and a gas turbine having a fuel supply control and being effective to drive the propeller, a governor means driven at a speed proportionate to turbine speed and having a speed-setting adjustment, said governor means being provided with a speed-sensitive member having a satisfied position, and overspeed contacts operated by said member when entering an overspeed condition from said satisfied position, means including the overspeed contacts connected to the fuel supply control for substantially instantaneously reducing the rate of flow of the fuel supplied to the turbine when said member leaves the satisfied position to register an overspeed error, means including the overspeed contacts connected to the controllable pitch propeller for variably increasing the pitch of the propeller at a rate proportional to the magnitude of speed error registered by said member, and means connected to said speed-setting adjustment including an operator-controlled motor of relatively slow sweep through its positioning range for only slowing causing said member to be disturbed from its satisfied position when the speed-setting of the governor is being reduced causing an overspeed error.

3. In combination with a fuel-supplied prime mover effective to drive a load, said prime mover having first operating means incorporated thereon for varying the flow of fuel supplied to the prime mover and having second operating means incorporated thereon for varying the load on the prime mover, governor means responsive to speed of the prime mover for controlling the operation of said first and second means, and control circuit means between said governor means and said operating means and including manual selector switching elements for selectively connecting the governor means to either of said first and second operating means for mutually exclusively controlling the operation of the same to vary the fuel flow and load on the prime mover.

4. In combination with a fuel-supplied prime mover effective to drive a load, said prime mover having fuel supply lines connected to a portion thereof and having first operating means incorporated thereon for varying the flow of fuel supplied through said fuel supply lines to the prime mover and having second operating means incorporated thereon for varying the load on the prime mover, said first means comprising electro-hydraulic means associated with said fuel supply lines of the prime mover for regulating fuel flow, governor means responsive to speed of the prime mover for controlling the operation of said first and second means, and control circuit means between said governor means and said operating means and including manual selector switch means for connecting the governor means to either of said first and second operating means for mutually exclusively controlling the operation of the same to vary the load on the prime mover and to effect regulation of the electro-hydraulic means to vary the fuel flow.

5. In combination with a prime mover having a fuel supply line and being effective to drive a load, said prime mover having first operating means incorporated thereon for varying the flow of fuel supplied to the prime mover and having second operating means incorporated thereon for varying the load on the prime mover, governor means responsive to speed of the prime mover for controlling the operation of said first and second means, and control circuit means between said governor means and said operating means and including switching elements for connecting the governor means to either of said first and second operating means for mutually exclusively controlling the operation of the same to vary the fuel flow and load on the prime mover, said first operating means comprising electro-hydraulic means including a bypass valve in the fuel supply line, and a servo piston mechanism for positioning the bypass valve, said servo piston mechanism comprising a plurality of valves hydraulically connected to a servo piston to admit and allow withdrawal of hydraulic working fluid from opposite sides of the servo piston for adjusting the bypass valve.

6. In combination with a prime mover having a fuel supply line and being effective to drive a load, said prime mover having first operating means incorporated thereon for varying the flow of fuel supplied to the prime mover and having second operating means incorporated thereon for varying the load on the prime mover, governor means responsive to speed of the prime mover for controlling the operation of said first and second means, and control circuit means between said governor means and said operating means and including switching elements for connecting the governor means to either of said first and second operating means for mutually exclusively controlling the operation of the same to vary the fuel flow and load on the prime mover, said first operating means comprising electro-hydraulic means including a bypass valve in the fuel supply line, a servo piston for positioning the bypass valve, a plurality of valves so constructed and arranged as to admit and release hydraulic working fluid from opposite sides of the servo piston thereby adjusting the bypass valve, and solenoid means responsive to output signals from said governor and connected to said plurality of valves for operating the same to move the servo piston and adjust the bypass valve.

7. In combination with a controllable pitch propeller and a gas turbine having a fuel supply control and being effective to drive the propeller, said fuel supply control incorporating a positioning motor of relatively fast effective action for substantially instantaneously changing the rate of flow of the fuel supplied to the turbine, a governor means driven at a speed proportionate to turbine speed and having a speed-setting adjustment, said governor means being provided with a speed-sensitive member having a satisfied position and overspeed contacts operated by said member when entering an overspeed condition from said satisfied position, means including the overspeed contacts connected to the positioning motor of the fuel supply control for reducing, substantially instantaneously according to the above-described manner, the rate of flow of the fuel supplied to the turbine when said member leaves the satisfied position to register an overspeed error, means including the overspeed contacts connected to the controllable pitch propeller for variably increasing the pitch of the propeller at a rate proportional to the magnitude of speed error registered by said member, and means connected to said speed-setting adjustment including an operator-controlled motor of relatively slow sweep through its positioning range for only slowly causing said member to be disturbed from its satisfied position when the speed-setting of the governor is being reduced causing an overspeed error.

8. In combination with a controllable pitch propeller, and a gas turbine having a fuel supply control and being effective to drive the propeller, said fuel supply control incorporating a positioning motor of relatively fast effective action for substantially instantaneously changing the rate of flow of the fuel supplied to the turbine, a governor means driven at a speed proportional to turbine speed and having a speed-setting adjustment, said governor means being provided with a speed-sensitive member having a satisfied position, and overspeed contacts operated by said member when entering an overspeed condition from said satisfied position, means including the overspeed contacts connected to the positioning motor of the fuel supply control for reducing, substantially instantaneously according to the above-described manner, the rate of flow of the fuel supplied to the turbine when said member leaves the satisfied position to register an overspeed error, means including the overspeed contacts connected to the controllable pitch propeller for variably increasing the pitch of the propeller at a rate proportional to the magnitude of speed error registered by said member, and means connected to said speed-setting adjustment including a control-circuit-controlled motor of relatively slow sweep through its positioning range for only slowly causing said member to be disturbed from its satisfied position when the speed-setting of the governor is being reduced causing an overspeed error and a plurality of operating resistors included in the control circuit for said motor for operating the same to control said motor.

9. In combination with a controllable pitch propeller and a gas turbine effective to drive the propeller, said gas turbine having a fuel supply control incorporating means for regulating the flow of fuel to the gas turbine, and means comprising a control resistor for operating the flow regulating means, a governor means driven at a speed proportionate to turbine speed and having a speed-setting adjustment, said governor means being provided with a speed-sensitive member having a satisfied position, and overspeed contacts operated by said member when entering an overspeed condition from said satisfied position, means including the overspeed contacts connected to the control resistor in the fuel supply control for disabling a portion of the control resistor for substantially instantaneously reducing the rate of flow of the fuel supplied to the turbine when said member leaves the satisfied position to register an overspeed error, means including the overspeed contacts connected to the controllable pitch propeller for variably increasing the pitch of the propeller at a rate proportional to the magnitude of speed error registered by said member, and means connected to said speed-setting adjustment including an operator-controlled motor of relatively slow sweep through its positioning range for only slowly causing said member to be disturbed from its satisfied position when the speed-setting of the governor is being reduced causing an overspeed error.

10. In combination with a controllable pitch propeller and a gas turbine effective to drive the propeller, said gas turbine having a fuel supply control incorporating means for regulating the flow of fuel to the gas turbine, and means comprising a control resistor for operating the flow regulating means, a governor means driven at a speed proportional to the turbine speed and having a speed-setting adjustment, said governor means being provided with a speed-sensitive member having a satisfied position and overspeed and underspeed contacts operated by said member when respectively entering an overspeed condition and an underspeed condition from said satisfied position, means including the overspeed contacts connected to the control resistor in the fuel supply control for disabling a portion of the resistor for substantially instantaneously reducing the rate of flow of the fuel supplied to the turbine when said member leaves the satisfied position to register an overspeed error, means including the underspeed contacts connected to the control resistor in the fuel supply control for disabling a portion of the resistor for substantially instantaneously increasing the rate of flow of the fuel supplied to the turbine when said member leaves the satisfied position to register an underspeed error, means including the overspeed contacts connected to the controllable pitch propeller for variably increasing the pitch of the propeller at a rate proportional to the magnitude of overspeed error registered by said member, and means connected to said speed-setting adjustment including an operator-controlled motor of relatively slow sweep through its positioning range for only slowly causing said member to be disturbed from its satisfied position when the speed-setting of the governor is being changed to cause underspeed or overspeed error.

References Cited in the file of this patent

UNITED STATES PATENTS

| Number | Name | Date |
|---|---|---|
| 548,733 | Williams | Oct. 29, 1895 |
| 685,796 | Reed | Nov. 5, 1901 |
| 746,337 | Junggren | Dec. 8, 1903 |
| 762,744 | McKay | June 14, 1904 |
| 1,288,635 | Markussen | Dec. 24, 1918 |
| 1,333,681 | Riley | Mar. 16, 1920 |
| 1,825,701 | Menniges | Oct. 6, 1931 |
| 2,003,857 | Hale | June 4, 1935 |
| 2,115,671 | Pfister | Apr. 26, 1938 |
| 2,175,743 | Coffman | Oct. 10, 1939 |
| 2,202,604 | Schlapfer | May 28, 1940 |
| 2,261,458 | Bailey et al. | Nov. 4, 1941 |
| 2,281,734 | Whittaker | May 5, 1942 |
| 2,288,912 | Mears | July 7, 1942 |
| 2,324,474 | Appel | July 20, 1943 |
| 2,390,786 | Geiselman | Dec. 11, 1945 |
| 2,412,990 | Kruse | Dec. 24, 1946 |
| 2,443,648 | Austin et al. | June 22, 1948 |
| 2,452,298 | Good | Oct. 26, 1948 |
| 2,457,595 | Orr | Dec. 28, 1948 |
| 2,463,552 | Newhall | Mar. 8, 1949 |
| 2,474,033 | Chamberlain | June 21, 1949 |
| 2,476,218 | Prime et al. | July 12, 1949 |
| 2,485,431 | Chudyk | Oct. 18, 1949 |
| 2,500,624 | Bailey | Mar. 14, 1950 |
| 2,525,694 | Lindsey et al. | Oct. 10, 1950 |
| 2,557,526 | Bobier, Jr., et al. | June 19, 1951 |
| 2,559,938 | Carey | July 10, 1951 |

OTHER REFERENCES

S. A. E. Journal, pp. 26–29, February 1949.